United States Patent
Crabtree et al.

(10) Patent No.: US 12,443,999 B2
(45) Date of Patent: Oct. 14, 2025

(54) SYSTEM AND METHOD FOR MODEL-BASED PREDICTION USING A DISTRIBUTED COMPUTATIONAL GRAPH WORKFLOW

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

(*) Notice: Subject to any disclaimer, the term of this patent is extended or adjusted under 35 U.S.C. 154(b) by 484 days.

(21) Appl. No.: 17/360,007

(22) Filed: Jun. 28, 2021

(65) Prior Publication Data
US 2022/0058745 A1    Feb. 24, 2022

Related U.S. Application Data

(63) Continuation-in-part of application No. 16/575,929, filed on Sep. 19, 2019, now Pat. No. 11,074,652, (Continued)

(51) Int. Cl.
*G06Q 40/08* (2012.01)
*G06N 7/01* (2023.01)
(Continued)

(52) U.S. Cl.
CPC ........... *G06Q 40/08* (2013.01); *G06N 7/01* (2023.01); *G06Q 30/0201* (2013.01); *G06Q 50/01* (2013.01)

(58) Field of Classification Search
CPC .... G06Q 40/08; G06Q 30/0201; G06Q 50/01; G06N 7/01
(Continued)

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |

(Continued)

FOREIGN PATENT DOCUMENTS

| | | |
|---|---|---|
| CN | 105302532 B | 6/2018 |
| WO | 2014159150 A1 | 10/2014 |
| WO | 2017075543 A1 | 5/2017 |

OTHER PUBLICATIONS

Simonian et al., Robust Value-At-Risk: An Information Theoretic Approach Huang, Alex, A Comparison of Value at Risk Approaches and a New Method with Extreme Value Theory and Kernel Estimator.

*Primary Examiner* — Bryan F Wright
(74) *Attorney, Agent, or Firm* — Galvin Patent Law LLC; Brian R Galvin

(57) ABSTRACT

A system and method for crowdsensing-based determination of risk management and contract validation, comprising at least a heterogeneous mixture of sensors and data-gathering techniques, a sensor fusion suite, and a business operating system, which ingests, transforms if necessary, and analyzes received data and develops and applies models of prediction of consequences of the sensor data and future events based on such data for purposes such as insurance liability and risk assessment, emergency services planning, and financial market predictions, and comparing historical models and data with current data and models to attempt to refine and utilize a more precise predictive model for these purposes.

10 Claims, 23 Drawing Sheets

Related U.S. Application Data which is a continuation-in-part of application No. 16/191,054, filed on Nov. 14, 2018, now Pat. No. 10,681,074, which is a continuation-in-part of application No. 15/655,113, filed on Jul. 20, 2017, now Pat. No. 10,735,456, which is a continuation-in-part of application No. 15/616,427, filed on Jun. 7, 2017, now abandoned, which is a continuation-in-part of application No. 14/925,974, filed on Oct. 28, 2015, now abandoned, said application No. 15/655,113 is a continuation-in-part of application No. 15/237,625, filed on Aug. 15, 2016, now Pat. No. 10,248,910, which is a continuation-in-part of application No. 15/206,195, filed on Jul. 8, 2016, now abandoned, which is a continuation-in-part of application No. 15/186,453, filed on Jun. 18, 2016, now abandoned, which is a continuation-in-part of application No. 15/166,158, filed on May 26, 2016, now abandoned, which is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, and a continuation-in-part of application No. 14/925,974, filed on Oct. 28, 2015, now abandoned.

(51) Int. Cl.
*G06Q 30/0201* (2023.01)
*G06Q 50/00* (2012.01)

(58) Field of Classification Search
USPC .......................................................... 726/25
See application file for complete search history.

(56) References Cited

U.S. PATENT DOCUMENTS

| | | | |
|---|---|---|---|
| 6,477,572 B1 | 11/2002 | Elderton et al. | |
| 7,072,863 B1 | 7/2006 | Phillips et al. | |
| 7,657,406 B2 | 2/2010 | Tolone et al. | |
| 7,698,213 B2 | 4/2010 | Lancaster | |
| 7,739,653 B2 | 6/2010 | Venolia | |
| 8,065,257 B2 | 11/2011 | Kuecuekyan | |
| 8,145,761 B2 | 3/2012 | Liu et al. | |
| 8,281,121 B2 | 10/2012 | Nath et al. | |
| 8,615,800 B2 | 12/2013 | Baddour et al. | |
| 8,788,306 B2 | 7/2014 | Delurgio et al. | |
| 8,793,758 B2 | 7/2014 | Raleigh et al. | |
| 8,914,878 B2 | 12/2014 | Burns et al. | |
| 8,997,233 B2 | 3/2015 | Green et al. | |
| 9,134,966 B2 | 9/2015 | Brock et al. | |
| 9,141,360 B1 | 9/2015 | Chen et al. | |
| 9,231,962 B1 | 1/2016 | Yen et al. | |
| 9,602,530 B2 | 3/2017 | Ellis et al. | |
| 9,654,495 B2 | 5/2017 | Hubbard et al. | |
| 9,672,355 B2 | 6/2017 | Titonis et al. | |
| 9,686,308 B1 | 6/2017 | Srivastava | |
| 9,762,443 B2 | 9/2017 | Dickey | |
| 9,887,933 B2 | 2/2018 | Lawrence, III | |
| 9,946,517 B2 | 4/2018 | Talby et al. | |
| 10,061,635 B2 | 8/2018 | Ellwein | |
| 10,102,480 B2 | 10/2018 | Dirac et al. | |
| 10,109,014 B1 * | 10/2018 | Bischoff | H04L 67/12 |
| 10,210,246 B2 | 2/2019 | Stojanovic et al. | |
| 10,210,255 B2 | 2/2019 | Crabtree et al. | |
| 10,242,406 B2 | 3/2019 | Kumar et al. | |
| 10,248,910 B2 | 4/2019 | Crabtree et al. | |
| 10,318,882 B2 | 6/2019 | Brueckner et al. | |
| 10,367,829 B2 | 7/2019 | Huang et al. | |
| 10,511,498 B1 | 12/2019 | Narayan et al. | |
| 10,878,509 B1 * | 12/2020 | Healy | G06Q 40/08 |
| 2003/0041254 A1 | 2/2003 | Challener et al. | |
| 2003/0145225 A1 | 7/2003 | Bruton et al. | |
| 2005/0289072 A1 | 12/2005 | Sabharwal | |
| 2006/0149575 A1 | 7/2006 | Varadarajan et al. | |
| 2007/0150744 A1 | 6/2007 | Cheng et al. | |
| 2009/0064088 A1 | 3/2009 | Barcia et al. | |
| 2009/0089227 A1 | 4/2009 | Sturrock et al. | |
| 2009/0182672 A1 | 7/2009 | Doyle | |
| 2009/0222562 A1 | 9/2009 | Liu et al. | |
| 2009/0293128 A1 | 11/2009 | Lippmann et al. | |
| 2010/0223226 A1 | 9/2010 | Alba et al. | |
| 2011/0060821 A1 | 3/2011 | Loizeaux et al. | |
| 2011/0087888 A1 | 4/2011 | Rennie | |
| 2011/0154341 A1 | 6/2011 | Pueyo et al. | |
| 2012/0066667 A1 | 3/2012 | Mascaro et al. | |
| 2012/0266244 A1 | 10/2012 | Green et al. | |
| 2012/0296845 A1 | 11/2012 | Andrews et al. | |
| 2013/0073062 A1 | 3/2013 | Smith et al. | |
| 2013/0132149 A1 | 5/2013 | Wei et al. | |
| 2013/0191416 A1 | 7/2013 | Lee et al. | |
| 2013/0246996 A1 | 9/2013 | Duggal et al. | |
| 2013/0304623 A1 | 11/2013 | Kumar et al. | |
| 2014/0156806 A1 | 6/2014 | Karpistsenko et al. | |
| 2014/0244612 A1 | 8/2014 | Bhasin et al. | |
| 2014/0279762 A1 | 9/2014 | Xaypanya et al. | |
| 2015/0112730 A1 * | 4/2015 | Binion | G07C 5/008 705/4 |
| 2015/0149979 A1 | 5/2015 | Talby et al. | |
| 2015/0163242 A1 | 6/2015 | Laidlaw et al. | |
| 2015/0169294 A1 | 6/2015 | Brock et al. | |
| 2015/0195192 A1 | 7/2015 | Vasseur et al. | |
| 2015/0236935 A1 | 8/2015 | Bassett | |
| 2015/0281225 A1 | 10/2015 | Schoen et al. | |
| 2015/0317481 A1 | 11/2015 | Gardner et al. | |
| 2015/0339263 A1 | 11/2015 | Ata et al. | |
| 2015/0347414 A1 | 12/2015 | Xiao et al. | |
| 2015/0379424 A1 | 12/2015 | Dirac et al. | |
| 2016/0004858 A1 | 1/2016 | Chen et al. | |
| 2016/0028758 A1 | 1/2016 | Ellis et al. | |
| 2016/0072845 A1 | 3/2016 | Chiviendacz et al. | |
| 2016/0078361 A1 | 3/2016 | Brueckner et al. | |
| 2016/0099960 A1 | 4/2016 | Gerritz et al. | |
| 2016/0105454 A1 | 4/2016 | Li et al. | |
| 2016/0119365 A1 | 4/2016 | Barel | |
| 2016/0140519 A1 | 5/2016 | Trepca et al. | |
| 2016/0275123 A1 | 9/2016 | Lin et al. | |
| 2016/0285732 A1 | 9/2016 | Brech et al. | |
| 2016/0342606 A1 | 11/2016 | Mouel et al. | |
| 2016/0350442 A1 | 12/2016 | Crosby | |
| 2016/0364307 A1 | 12/2016 | Garg et al. | |
| 2017/0019678 A1 | 1/2017 | Kim et al. | |
| 2017/0063896 A1 | 3/2017 | Muddu et al. | |
| 2017/0083380 A1 | 3/2017 | Bishop et al. | |
| 2017/0126712 A1 | 5/2017 | Crabtree et al. | |
| 2017/0139763 A1 | 5/2017 | Ellwein | |
| 2017/0149802 A1 | 5/2017 | Huang et al. | |
| 2017/0193110 A1 | 7/2017 | Crabtree et al. | |
| 2017/0206360 A1 | 7/2017 | Brucker et al. | |
| 2017/0322959 A1 | 11/2017 | Tidwell et al. | |
| 2017/0323089 A1 | 11/2017 | Duggal et al. | |
| 2018/0197128 A1 | 7/2018 | Carstens et al. | |
| 2018/0300930 A1 | 10/2018 | Kennedy et al. | |
| 2018/0336250 A1 * | 11/2018 | Llaves | G06F 16/24558 |
| 2019/0082305 A1 | 3/2019 | Proctor | |
| 2019/0095533 A1 | 3/2019 | Evine et al. | |
| 2022/0058745 A1 * | 2/2022 | Crabtree | G06N 5/022 |

* cited by examiner

SYSTEM AND METHOD FOR MODEL-BASED PREDICTION USING A DISTRIBUTED COMPUTATIONAL GRAPH WORKFLOW

CROSS-REFERENCE TO RELATED APPLICATIONS

Priority is claimed in the application data sheet to the following patents or patent applications, the entire written description of each of which is expressly incorporated herein by reference in its entirety:
Ser. No. 16/575,929
Ser. No. 16/191,054
Ser. No. 15/655,113
Ser. No. 15/616,427
Ser. No. 14/925,974
Ser. No. 15/237,625
Ser. No. 15/206,195
Ser. No. 15/186,453
Ser. No. 15/166,158
Ser. No 15/141,752
Ser. No. 15/091,563
Ser. No. 14/986,536
Ser. No. 14/925,974

BACKGROUND OF THE INVENTION

Field of the Invention

The disclosure relates to the field of data management, and more particularly to the field of data and risk analytics.

Discussion of the State of the Art

Modern approaches to determining insurance and insurance risk do not fully utilize today's interconnected world of telematics sensors and devices. Whether its home insurance or auto insurance, the vast majority of available data e.g., big data, telematics data, IoT data, etc. is not used in an efficient fashion in order to better determine premiums and other insurance products.

What is needed is a system and method for determining and adjusting insurance products using big data and crowd-sensing telematics.

SUMMARY OF THE INVENTION

Accordingly, the inventor has developed a system and method system for crowdsensing-based determination of risk management and contract validation that is designed to take in a heterogeneous plurality of network-connected sensors and data inputs in a sensor fusion suite which may then transform and analyze them into relevant knowledge graphs or Directed Computational Graphs (DCG), and hone models of predicting outcomes of the sensor data or future related events, for instance gathering satellite imaging, weather data, information about the date and historical information about hurricanes in the Florida area, to deduce if a hurricane is likely to occur in the next month, and a possible trajectory it may take. Many uses for this invention are disclosed.

According to a first preferred embodiment, a system for crowdsensing-based insurance premiums is disclosed, comprising: a computing device comprising a memory, a processor, and a non-volatile data storage device; a plurality of network-connected physical sensors; a sensor fusion suite comprising a first plurality of programming instructions stored in the memory and operating on the processor, wherein the first plurality of programming instructions, when operating on the processor, causes the computing device to: automatically gather telematics data from the plurality of network-connected physical sensors; record the telematics data and the time of receipt in a multidimensional time-series database stored on the non-volatile data storage device; retrieve a model from the non-volatile data storage device for prediction of a probability of a future event from the received data; send the telematics data and the model to the distributed computational graph module for processing; receive the processed data from the distributed computational graph module; predict the probability of a future event from the processed data; determine a premium for an insurance product based on at least the probability of the future event; and a distributed computational graph module comprising a second plurality of programming instructions stored in the memory and operating on the processor, wherein the second plurality of programming instructions, when operating on the processor, causes the computing device to: receive the model for processing from the sensor fusion suite; construct a distributed computational graph from the model, the distributed computational graph representing a data processing workflow and comprising a directed graph with nodes representing data transformations and edges representing messaging between the nodes; receive the telematics data from the sensor fusion suite; and process the telematics data according to the data processing workflow of the distributed computational graph; and send the processed data to the sensor fusion suite.

According to a second preferred embodiment, a method for crowdsensing-based insurance premiums is disclosed, comprising the steps of: automatically gathering telematics data from a network-connected physical sensor; recording the telematics data and the time of receipt in a multidimensional time-series database stored on the non-volatile data storage device; retrieving a model from the non-volatile data storage device for prediction of a probability of a future event from the received data; constructing a distributed computational graph from the model, the distributed computational graph representing a data processing workflow and comprising a directed graph with nodes representing data transformations and edges representing messaging between the nodes; processing the telematics data according to the data processing workflow of the distributed computational graph; predicting the probability of a future event from the processed data;
determining a premium for an insurance product based on at least the probability of the future event.

According to various aspects; wherein the sensor fusion suite further causes the computing device to: generate a remedial action based at least in part on the probability of the future event; transmit the remedial action to a notification device; automatically gather updated telematics data from the plurality of network-connected physical sensors; and determine a premium for an insurance product based on a comparison between the remedial action and the updated telematics data; wherein the sensor fusion suite further ingests data from a network-enabled financial market crawler, which may automatically gather data from financial markets including stock prices and trades; wherein the sensor fusion suite further ingests data from manual data entry, including human observers during a natural disaster entering data into the sensor fusion suite over a network; wherein the sensor fusion suite further ingests data from network connected cameras, including either or all of video, audio, and image data; wherein the sensor fusion suite uses machine learning techniques to construct predictive models of received data.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
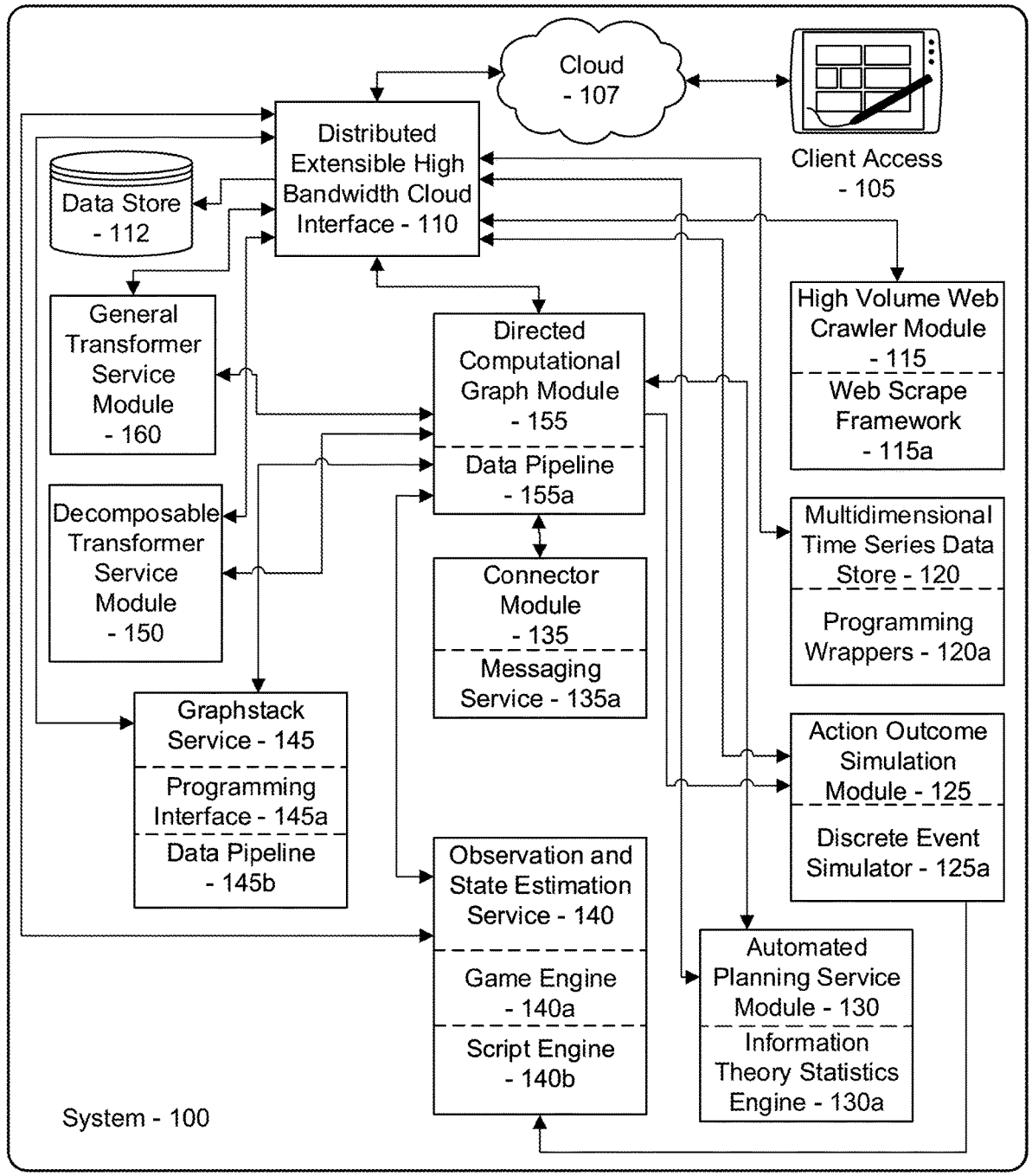
FIG. 1 is a diagram of an exemplary architecture of a business operating system according to an embodiment of the invention.

The inventor has conceived, and reduced to practice, a system and method system for crowdsensing-based determination of risk management and contract validation that is designed to take in a heterogeneous plurality of network-connected sensors and data inputs in a sensor fusion suite which may then transform and analyze them into relevant knowledge graphs or Directed Computational Graphs (DCG), and hone models of predicting outcomes of the sensor data or future related events, for instance gathering satellite imaging, weather data, information about the date and historical information about hurricanes in the Florida area, to deduce if a hurricane is likely to occur in the next month, and a possible trajectory it may take. Many uses for this invention are disclosed.

According to one embodiment, a system and methods for discerning an objective and factually supported view of reality in scenarios based on a mix of public and private data is disclosed, for many purposes including verification of insurance claims, prediction of insurance claims and financial market movements, prediction of natural disasters or certain kinds of human events, and more. This is important for numerous entities seeking a reasonably objective independent party to establish event occurrence and impact for the purposes of direct financial transactions as well as to support model development and training based on the labels data associated which may influence key models, future underwriting or risk management decisions. In the presence of adversarial data where gaming open or public or social data is prevalent, the ability to identify factually-supported and/or disputed information becomes paramount to public safety, private risk management activities, and risk transfer (e.g., insurance). The disclosed invention provides a system and methods to collect, ingest, transform if needed, analyze, and model data associated with establishing a probabilistic description and dossier of evidence for a given occurrence.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, a "swimlane" is a communication channel between a time series sensor data reception and apportioning device and a data store meant to hold the apportioned data time series sensor data. A swimlane is able to move a specific, finite amount of data between the two devices. For example, a single swimlane might reliably carry and have incorporated into the data store, the data equivalent of 5 seconds worth of data from 10 sensors in 5 seconds, this being its capacity.

Attempts to place 5 seconds worth of data received from 6 sensors using one swimlane would result in data loss.

As used herein, a "metaswimlane" is an as-needed logical combination of transfer capacity of two or more real swimlanes that is transparent to the requesting process. Sensor studies where the amount of data received per unit time is expected to be highly heterogeneous over time may be initiated to use metaswimlanes. Using the example used above that a single real swimlane may transfer and incorporate the 5 seconds worth of data of 10 sensors without data loss, the sudden receipt of incoming sensor data from 13 sensors during a 5 second interval would cause the system to create a two swimlane metaswimlane to accommodate the standard 10 sensors of data in one real swimlane and the 3 sensor data overage in the second, transparently added real swimlane, however no changes to the data receipt logic would be needed as the data reception and apportionment device would add the additional real swimlane transparently.

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB Aug. 13, 1965" and "speaks English". Similar to the use of properties to further describe the information in a node, a relationship between two nodes that forms an edge can be qualified using a "label". Thus, given a second node "Thomas G," an edge between lames R" and "Thomas G" that indicates that the two people know each other might be labeled "knows." When graph theory notation (Graph= (Vertices, Edges)) is applied this situation, the set of nodes are used as one parameter of the ordered pair,V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as a example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various aspects may preferentially employ one or another of the various data storage subsystems available in the art (or available in the future), the invention should not be construed to be so limited, as any data storage architecture may be used according to the aspects. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

A "data context", as used herein, refers to a set of arguments identifying the location of data. This could be a Rabbit queue, a .csv file in cloud-based storage, or any other such location reference except a single event or record. Activities may pass either events or data contexts to each other for processing. The nature of a pipeline allows for direct information passing between activities, and data locations or files do not need to be predetermined at pipeline start.

A "pipeline", as used herein and interchangeably referred to as a "data pipeline" or a "processing pipeline", refers to a set of data streaming activities and batch activities. Streaming and batch activities can be connected indiscriminately within a pipeline. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, or optionally an external trigger. The events are held in a queue or similar until processing. Each batch activity may contain a "source" data context (this may be a streaming context if the upstream activities are streaming), and a "destination" data context (which is passed to the next activity). Streaming activities may have an optional "destination" streaming data context (optional meaning: caching/persistence of events vs. ephemeral), though this should not be part of the initial implementation.

Conceptual Architecture

Figure 3A:
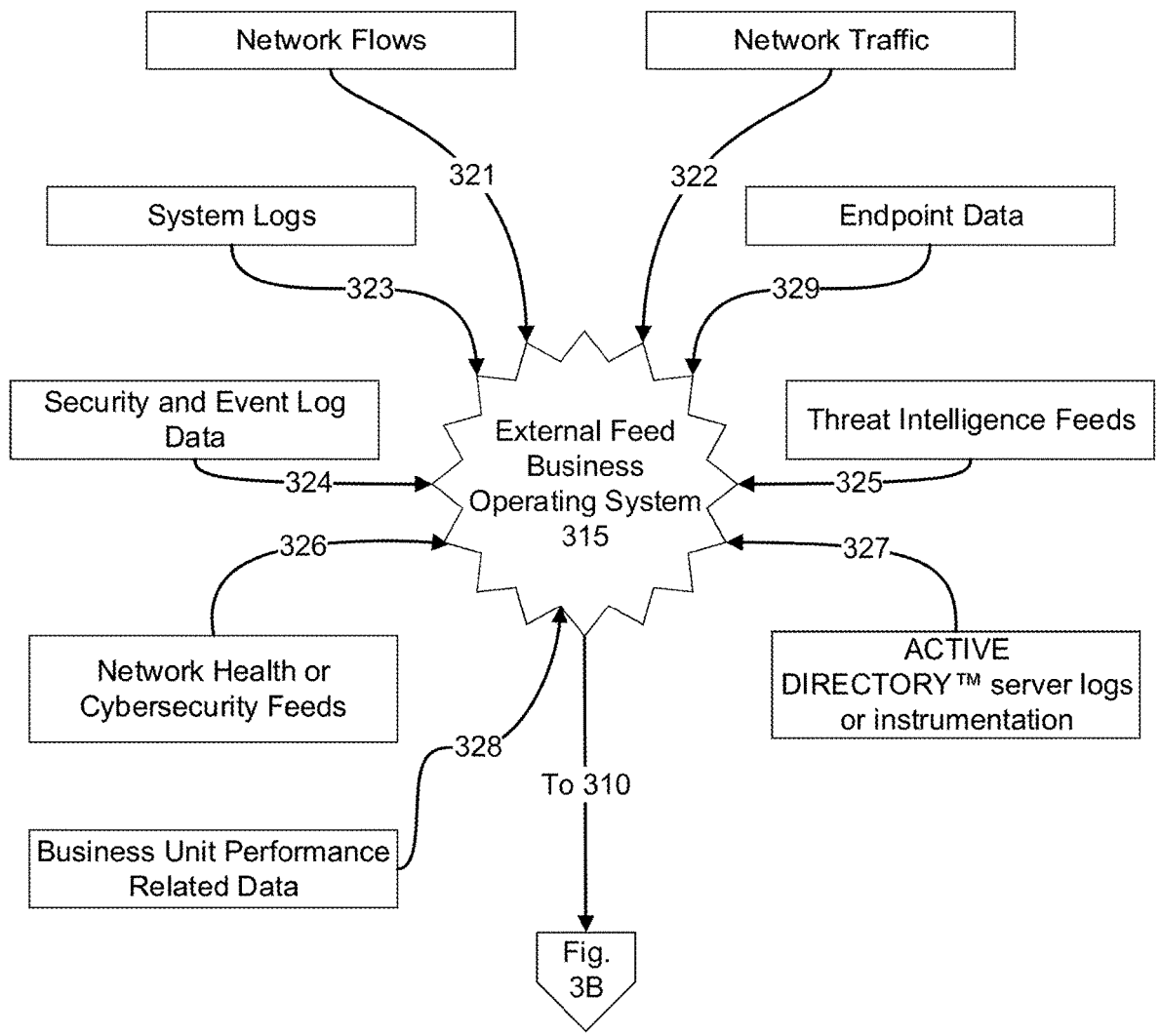
FIG. 3A is a process diagram showing business operating system functions in use to mitigate cyberattacks.
Figure 3B:
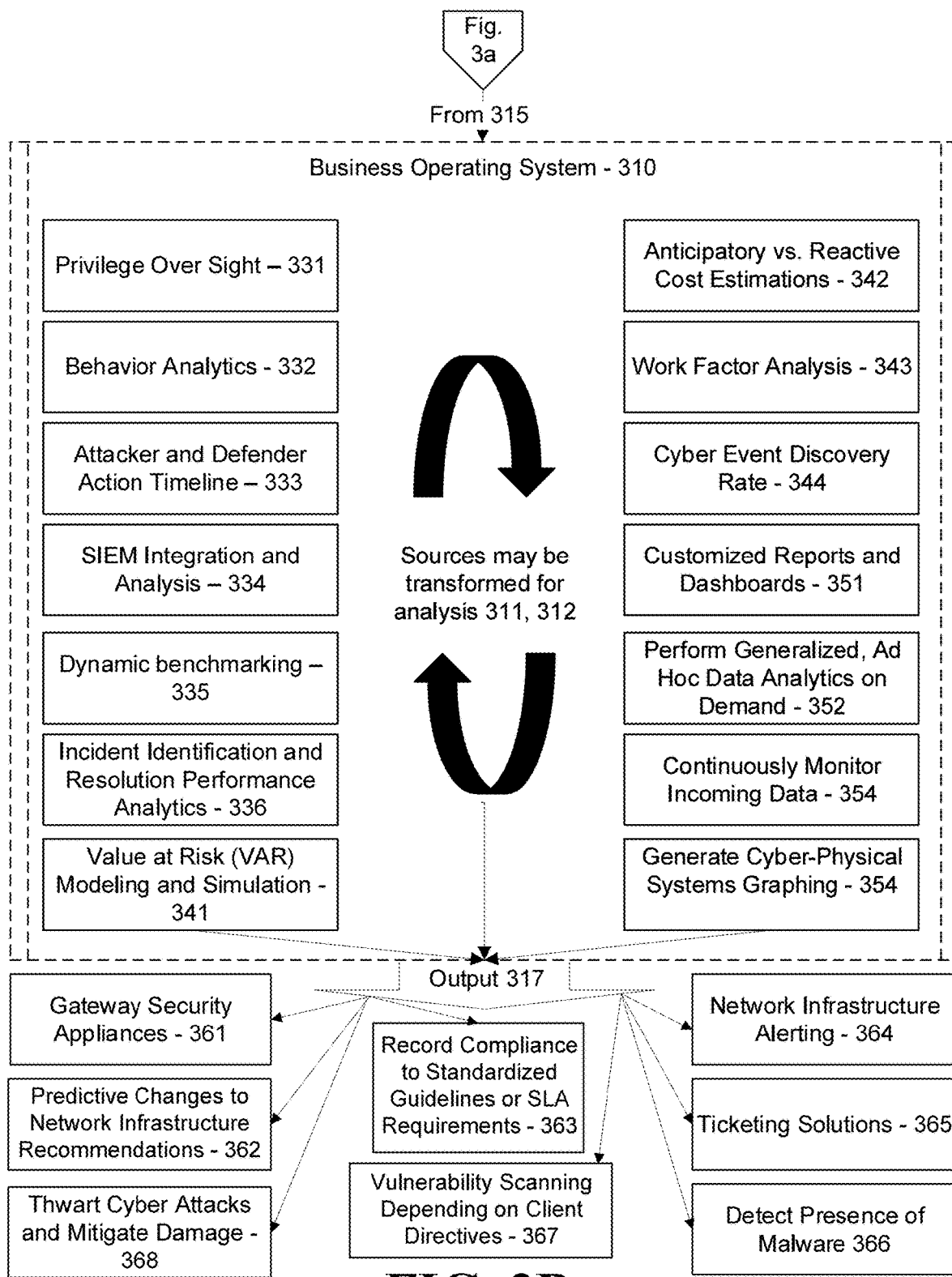
FIG. 3B is a process diagram showing business operating system functions in use to mitigate cyberattacks.

FIG. 3A and FIG. 3B are a process diagram showing business operating system functions in use to mitigate cyberattacks. Input network data which may include network flow patterns 321, the origin and destination of each piece of measurable network traffic 322, system logs from servers and workstations on the network 323, endpoint data 329, any security event log data from servers or available security information and event (SIEM) systems 324, external threat intelligence feeds 325, external network health or cybersecurity feeds 326, Kerberos domain controller or ACTIVE DIRECTORY™ server logs or instrumentation 327 and business unit performance related data 328, among many other possible data types for which the invention was designed to analyze and integrate, may pass into 315 the business operating system 310 for analysis as part of its cyber security function. These multiple types of data from a plurality of sources may be transformed for analysis 311, 312 using at least one of the specialized cybersecurity, risk assessment or common functions of the business operating system in the role of cybersecurity system, such as, but not limited to network and system user privilege oversight 331, network and system user behavior analytics 332, attacker and defender action timeline 333, SIEM integration and analysis 334, dynamic benchmarking 335, and incident identification and resolution performance analytics 336 among other possible cybersecurity functions; value at risk (VAR) modeling and simulation 341, anticipatory vs. reactive cost estimations of different types of data breaches to establish priorities 342, work factor analysis 343 and cyber event discovery rate 344 as part of the system's risk analytics capabilities; and the ability to format and deliver customized reports and dashboards 351, perform generalized, ad hoc data analytics on demand 352, continuously monitor, process and explore incoming data for subtle changes or diffuse informational threads 353 and generate cyber-physical systems graphing 354 as part of the business operating system's common capabilities. Output 317 can be used to configure network gateway security appliances 361, to assist in preventing network intrusion through predictive change to infrastructure recommendations 362, to alert an enterprise of ongoing cyberattack early in the attack cycle, possibly thwarting it but at least mitigating the damage 362, to record compliance to standardized guidelines or SLA requirements 363, to continuously probe existing network infrastructure and issue alerts to any changes which may make a breach more likely 364, suggest solutions to any domain controller ticketing weaknesses detected 365, detect presence of malware 366, perform one time or continuous vulnerability scanning depending on client directives 367, and thwart and mitigate the effects of cyber attacks including malware of various types 368. These examples are, of course, only a subset of the possible uses of the system, they are exemplary in nature and do not reflect any boundaries in the capabilities of the invention.

Figure 4:
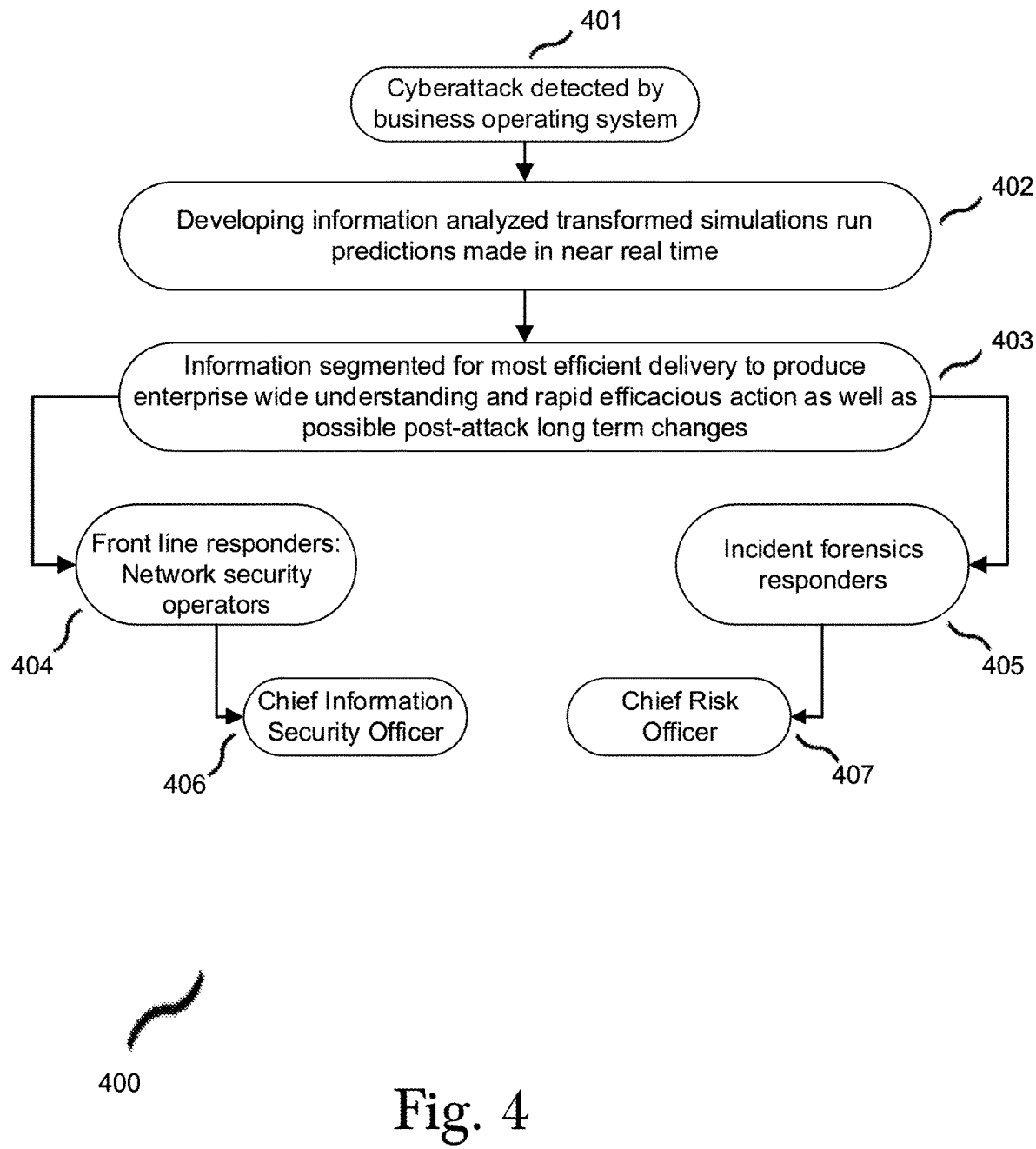
FIG. 4 is a process flow diagram of a method for segmenting cyberattack information to appropriate corporation parties.

FIG. 4 is a process flow diagram of a method for segmenting cyberattack information to appropriate corporation parties 400. As previously disclosed 200, 351, one of the strengths of the advanced cyber-decision platform is the ability to finely customize reports and dashboards to specific audiences, concurrently is appropriate. This customization is possible due to the devotion of a portion of the business operating system's programming specifically to outcome presentation by modules which include the observation and state estimation service 140 with its game engine 140a and script interpreter 140b. In the setting of cybersecurity, issuance of specialized alerts, updates and reports may significantly assist in getting the correct mitigating actions done in the most timely fashion while keeping all participants informed at predesignated, appropriate granularity. Upon the detection of a cyberattack by the system 401 all available information about the ongoing attack and existing cybersecurity knowledge are analyzed, including through predictive simulation in near real time 402 to develop both the most accurate appraisal of current events and actionable recommendations concerning where the attack may progress and how it may be mitigated. The information generated in totality is often more than any one group needs to perform their mitigation tasks. At this point, during a cyberattack, providing a single expansive and all inclusive alert, dashboard image, or report may make identification and action upon the crucial information by each participant more difficult, therefore the cybersecurity focused embodiment may create multiple targeted information streams each concurrently designed to produce most rapid and efficacious action throughout the enterprise during the attack and issue follow-up reports with and recommendations or information that may lead to long term changes afterward 403. Examples of groups that may receive specialized information streams include but may not be limited to front line responders during the attack 404, incident forensics support both during and after the attack 405, chief information security officer 406 and chief risk officer 407 the information sent to the latter two focused to appraise overall damage and to implement both mitigating strategy and preventive changes after the attack. Front line responders may use the cyber-decision platform's analyzed, transformed and correlated information specifically sent to them to probe the extent of the attack, isolate such things as: the predictive attacker's entry point onto the enterprise's network, the systems involved or the predictive ultimate targets of the attack and may use the simulation capabilities of the system to investigate alternate methods of successfully ending the attack and repelling the attackers in the most efficient manner, although many other queries known to those skilled in the art are also answerable by the invention. Simulations run may also include the predictive effects of any attack mitigating actions on normal and critical operation of the enterprise's IT systems and corporate users. Similarly, a chief information security officer may use the cyber-decision platform to predictively analyze what corporate information has already been compromised, predictively simulate the ultimate information targets of the attack that may or may not have been compromised and the total impact of the attack what can be done now and in the near future to safeguard that information. Further, during retrospective forensic inspection of the attack, the forensic responder may use the cyber-decision platform to clearly and completely map the extent of network infrastructure through predictive simulation and large volume data analysis. The forensic analyst may also use the platform's capabilities to perform a time series and infrastructural spatial analysis of the attack's progression with methods used to infiltrate the enterprise's subnets and servers. Again, the chief risk officer would perform analyses of what information was stolen and predictive simulations on what the theft means to the enterprise as time progresses. Additionally, the system's predictive capabilities may be employed to assist in creation of a plan for changes of the IT infrastructural that should be made that are optimal for remediation of cybersecurity risk under possibly limited enterprise budgetary constraints in place at the company so as to maximize financial outcome.

As the embodiment is expressively scriptable in a large number of programmed capabilities, which include data presentation, the segmentation of information, parties chosen to receive information, and the information received would be expected to vary, perhaps significantly, between corporate clients of business operating system cybersecurity embodiments depending on individual corporate policies, philosophies and make-up, just to name a few examples.

Figure 8:
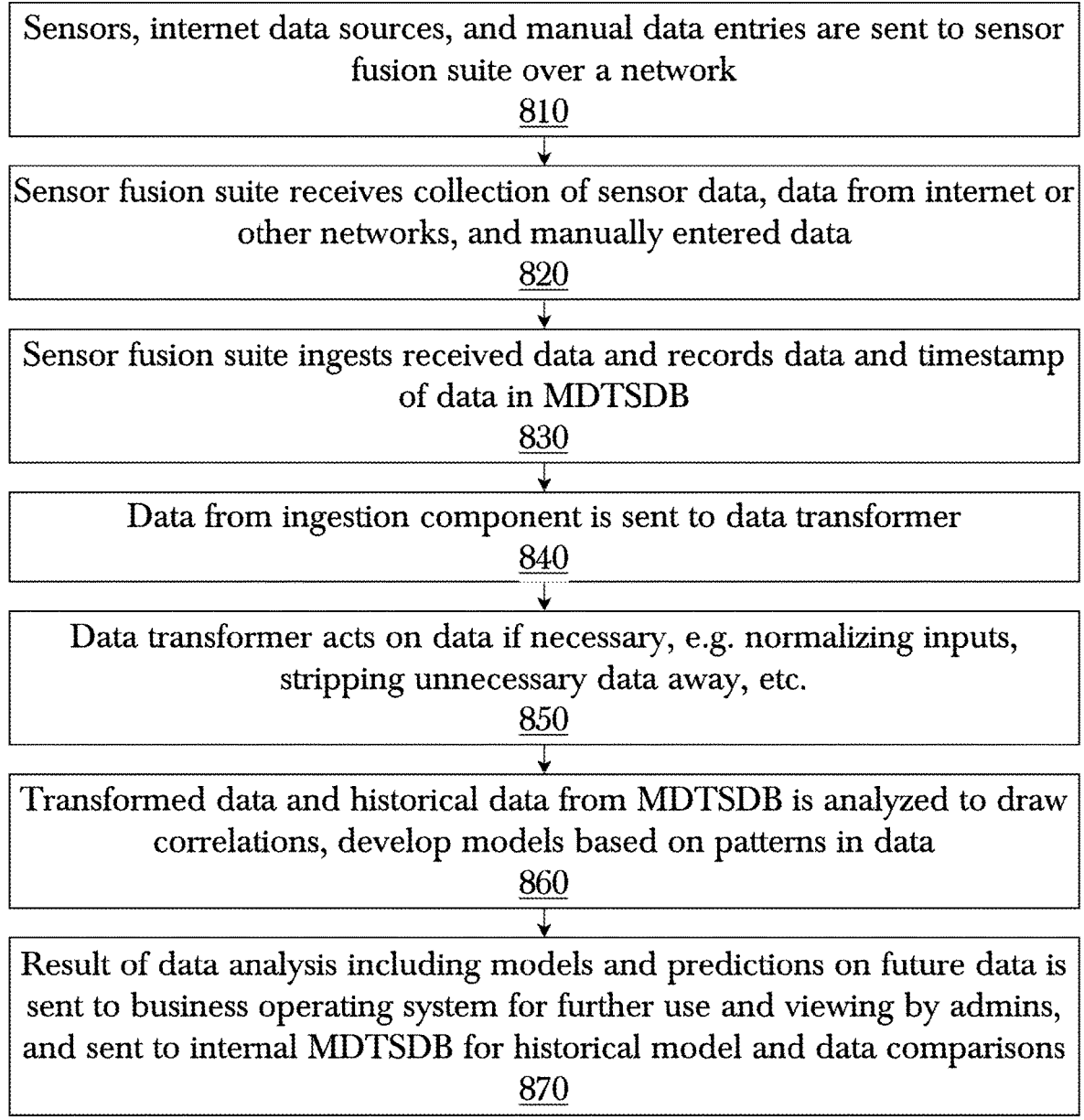
FIG. 8 is a method diagram for crowd-sourced refinement of natural phenomenon for risk management and contract validation.

FIG. 8 is a method diagram for crowd-sourced refinement of natural phenomenon for risk management and contract validation. Sensors, internet data sources, and manual data entries are sent to the sensor fusion suite over a network 810, either through the sensor fusion suite polling them actively, or through the various data sources actively sending data to the sensor fusion suite, which receives and analyzes them. Manual data entry and automated webcrawling of data can both be accomplished by purchasing the rights to data from other groups, individuals, or corporations, and configuring the sensor fusion suite to poll these sources or receive these manual data sources as required. The sensor fusion suite then receives the collection of sensor data, data from internet or other networks, and manually entered data 820, causing it to ingest received data and record the data and timestamps of data in a connected or internal MDTSDB 830. Internal to the sensor fusion suite, data from an ingestion component is sent to a data transformer 840, where the data transformer acts on received data if necessary, for instance by normalizing inputs, stripping unnecessary data away, and more if applicable 850. Since the ability to include subjective and qualitative assessments and quantitative observables from multiple sources (e.g. oblique image, satellite, private social and news feeds) is useful to the invention and may result from the heterogeneous sensory data acquired, the data transformer may further produce a directed computational graph based on the received data including knowledge graph creation via data semantification. Semantified views on incoming data (addressing cleanliness and deduplication type issues, for instance) support the use of such incoming heterogeneous data, including with probabilistic evaluation via uncertainty quantification or UQ, for use in triggers/truth and sensor validation. This may be performed by a data transformer and data analyzer in tandem, or separately. The data after any transformations may have taken place, and any similar historical data from the MDTSDB are analyzed to draw correlations and develop models based on patterns in data 860 for the purposes of predicting events that may occur as a result of the analyzed data, said result of the data analysis including models and predictions on future data is then sent to a business operating system for further use and viewing by administratorss, and sent to internal MDTSDB for later historical model and data comparisons 870.

Figure 9:
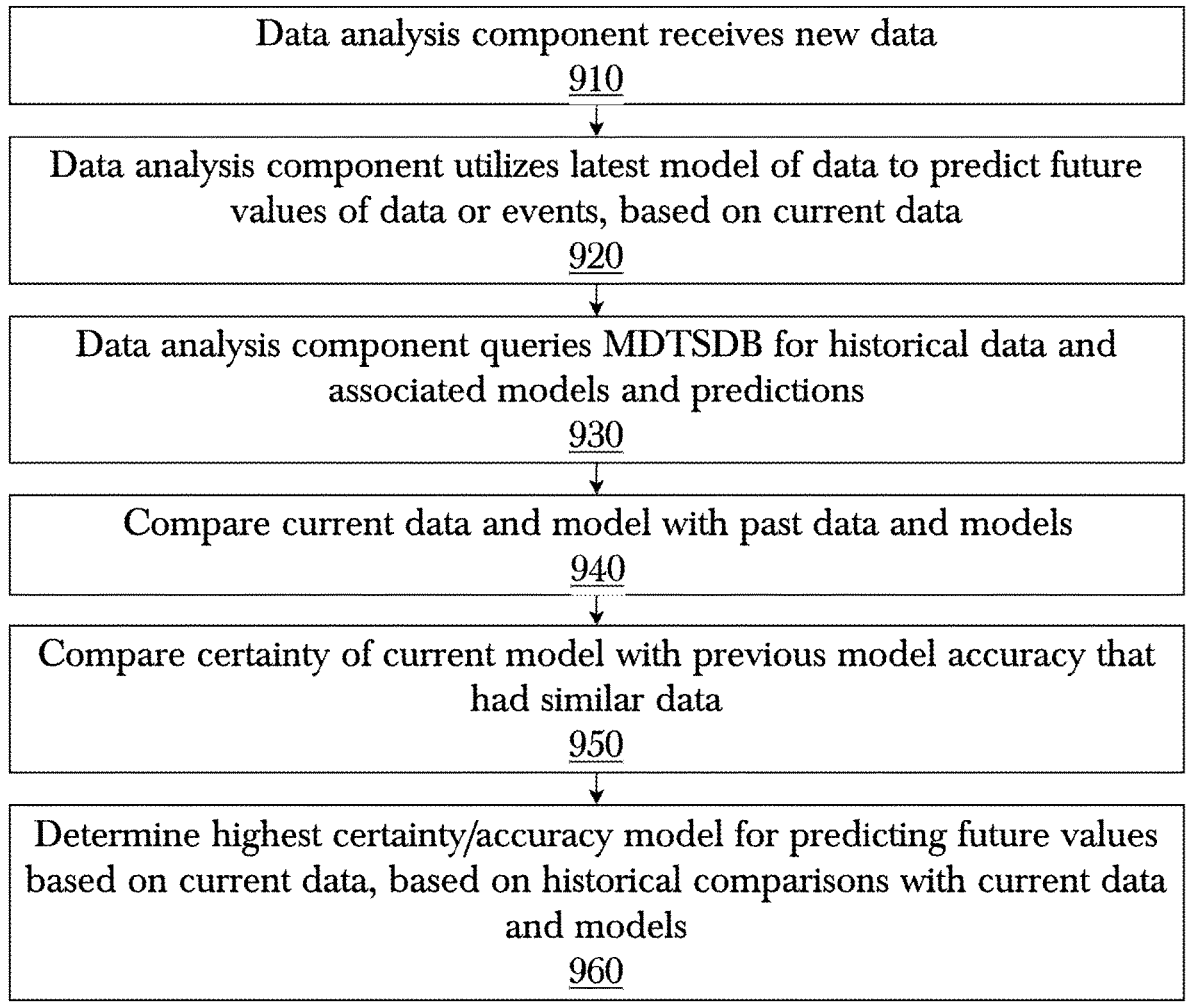
FIG. 9 is a method diagram illustrating testing and comparison of historical models and predictions with current models and predictions to find the most statistically accurate model for analyzing fused sensor data.

FIG. 9 is a method diagram illustrating testing and comparison of historical models and predictions with current models and predictions to find the most statistically accurate model for analyzing fused sensor data. First a data analysis component receives new data 910 from network-connected sensors and data sources, before a data analysis component utilizes the most recent relevant model of data to predict future values of data or events, based on current data 920. A data analysis component queries an internal or connected MDTSDB for historical data and associated models and predictions 930, allowing the analysis component to compare current data and models with past data and models 940, to compare the certainty of a current model with the accuracy of the previous model that had similar data 950. Such a comparison may take the form of a basic statistical analysis of a previous model's accuracy and comparing the similarity to variables in the previous model predictions with the current data and model, or a neural network my be utilized to move from a model of less accuracy to higher accuracy over time, to find the highest certainty/accuracy model for predicting future values based on current data, and based on historical comparisons with current data and models 960.

Figure 10:
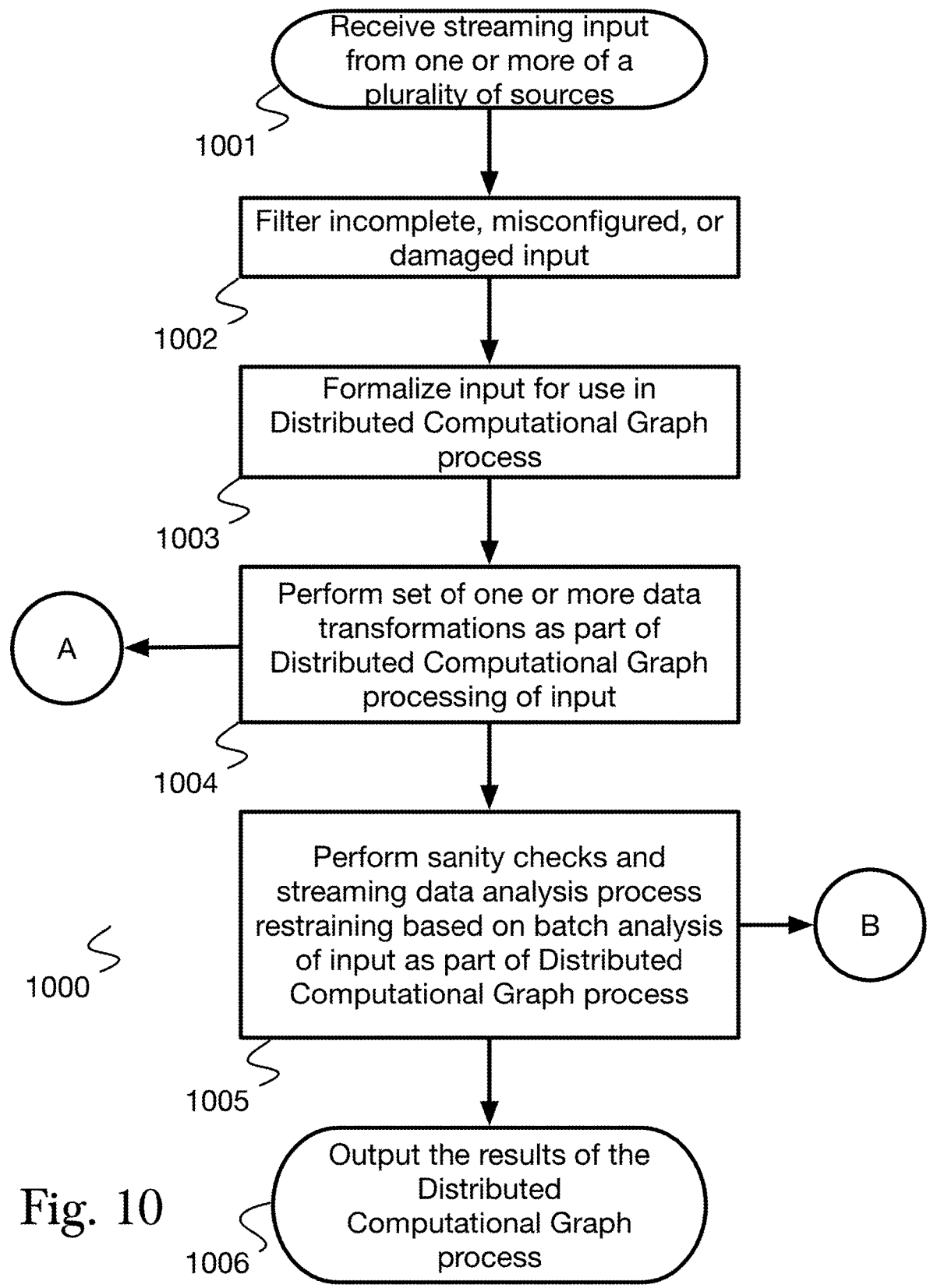
FIG. 10 is a process flow diagram of a method for the receipt, processing and predictive analysis of streaming data according to one aspect.

FIG. 10 is a process flow diagram of a method 1000 for predictive analysis of very large data sets using the distributed computational graph. One or more streams of data from a plurality of sources, which includes, but is in no way not limited to, a number of physical sensors, web based questionnaires and surveys, monitoring of electronic infrastructure, crowd sourcing campaigns, and direct human interaction, may be received by system 1001. The received stream is filtered 1002 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1600 while another substream may be formalized 1003 for transformation pipeline analysis 1004 and retraining 1005. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the aspect, individual transformations can receive input of expected form from more than one source or receive no input at all as would a transformation acting as a timestamp. According to the aspect, individual transformations, may not modify the data as would be encountered with a data store acting as a queue for downstream transformations. According to the aspect, individual transformations may provide output to more than one downstream transformations. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical, where the output of one of the internal transformations serves as the input of one of its antecedents allowing recursive analysis to be run. The result of transformation pipeline analysis may then be modified by results from batch analysis of the data stream and output 1006 in format predesigned by the authors of the analysis with could be human readable summary printout, human readable instruction printout, human-readable raw printout, data store, or machine encoded information of any format known to the art to be used in further automated analysis or action schema.

Figure 11:
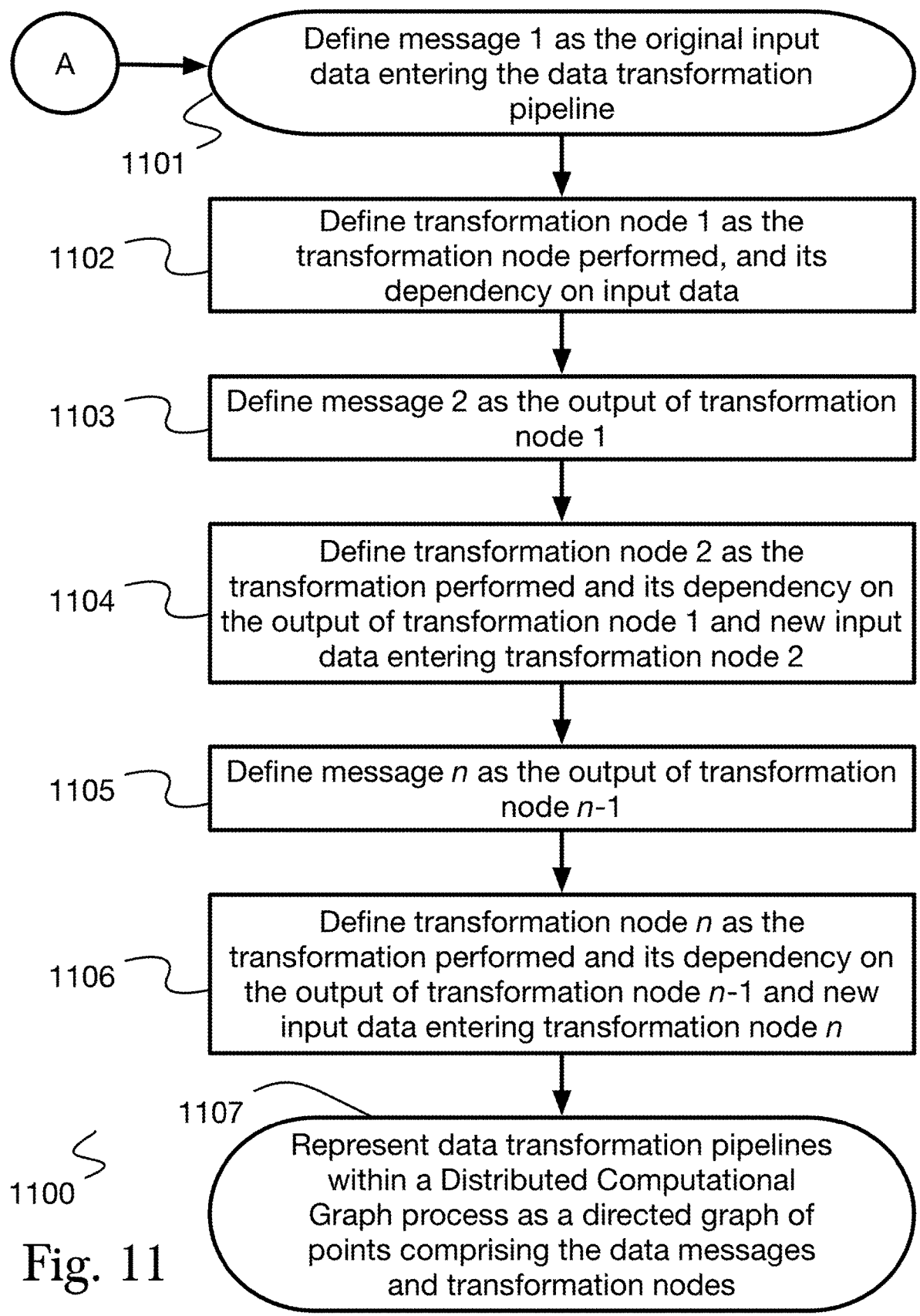
FIG. 11 is a process flow diagram of a method for representing the operation of the transformation pipeline as a directed graph function according to one aspect.

FIG. 11 is a process flow diagram of a method 1100 for an aspect of modeling the transformation pipeline module of the invention as a directed graph using graph theory. According to the aspect, the individual transformations 1102, 1104, 1106 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_j$, is defined with the function in: $t_i$ $d_1 \ldots d_k$ such that in($t_i$)={$d_1 \ldots d_k$} and describes a transformation with k inputs. Similarly, the output of an individual transformation is defined as the function out: $t_i$ [$ld_1$] to describe transformations that produce a single output (usable by other transformations). A dependency function can now be defined such that dep($t_a$, $t_b$) out($t_a$)in($t_b$)The messages carrying the data stream through the transformation pipeline 1101,1103, 1105 make up the graph edges. Using the above definitions, then, a transformation pipeline within the invention can be defined as G=(V,E) where message($t_1, t_2 \ldots t_{(n-1)}, t_n$)V and all transformations $t_1 \ldots t_n$ and all dependencies dep($t_i,t_j$)E 1107.

Figure 12:
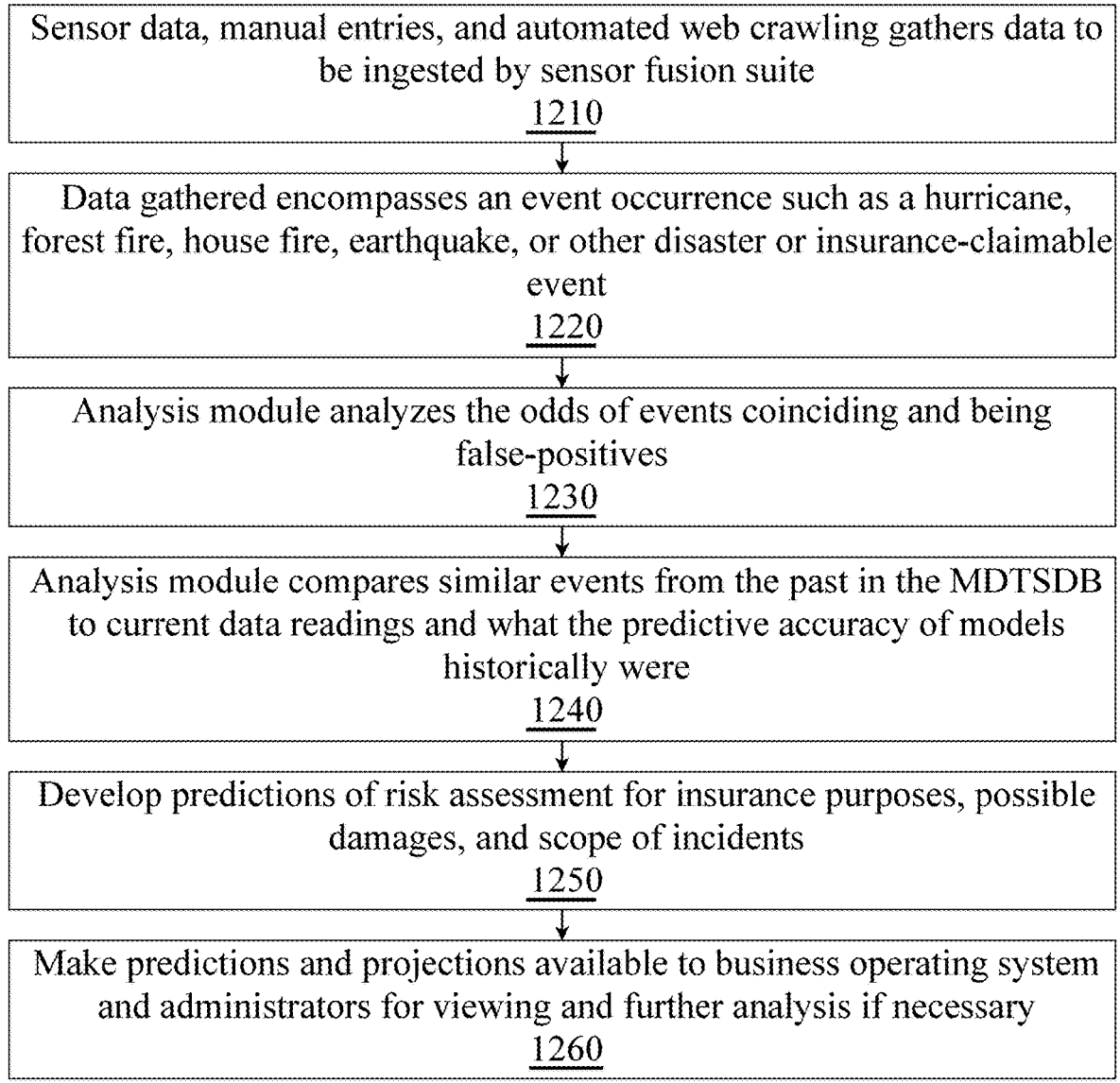
FIG. 12 is a method diagram illustrating an insurance use-case of the system.

FIG. 12 is a method diagram illustrating an insurance use-case of the system. First, sensor data, manual entries, and automated web crawling components gather data to be ingested by sensor fusion suite 1210, either through active polling of data sources or by data sources sending data actively to the sensor fusion suite. Data gathered will encompass an event occurrence or occurrences such as a hurricane, forest fire, house fire, earthquake, or other disaster or insurance-claimable event 1220, allowing an analysis module to analyze the probability of events coinciding and being false-positives 1230 given historical or newly developed event modelling. Machine learning techniques such as supervised neural networks may be used in an analysis module to compare similar events from the past in the MDTSDB to current data readings and what the predictive accuracy of models historically were 1240, to produce gradually more and more accurate models for varying sets of data. After this is accomplished, the system develops predictions of risk assessment for insurance purposes, possible damages, and scope of incidents 1250, to aid in insurance companies more adequately being able to predict costs and liability both during events and outside of the events (for instance, examining the likelihood that a given area with certain characteristics and history might encounter certain kinds of disasters in a given timeframe). The system then makes predictions and projections available to business operating system and administrators for viewing and further analysis if necessary 1260.

Figure 13:
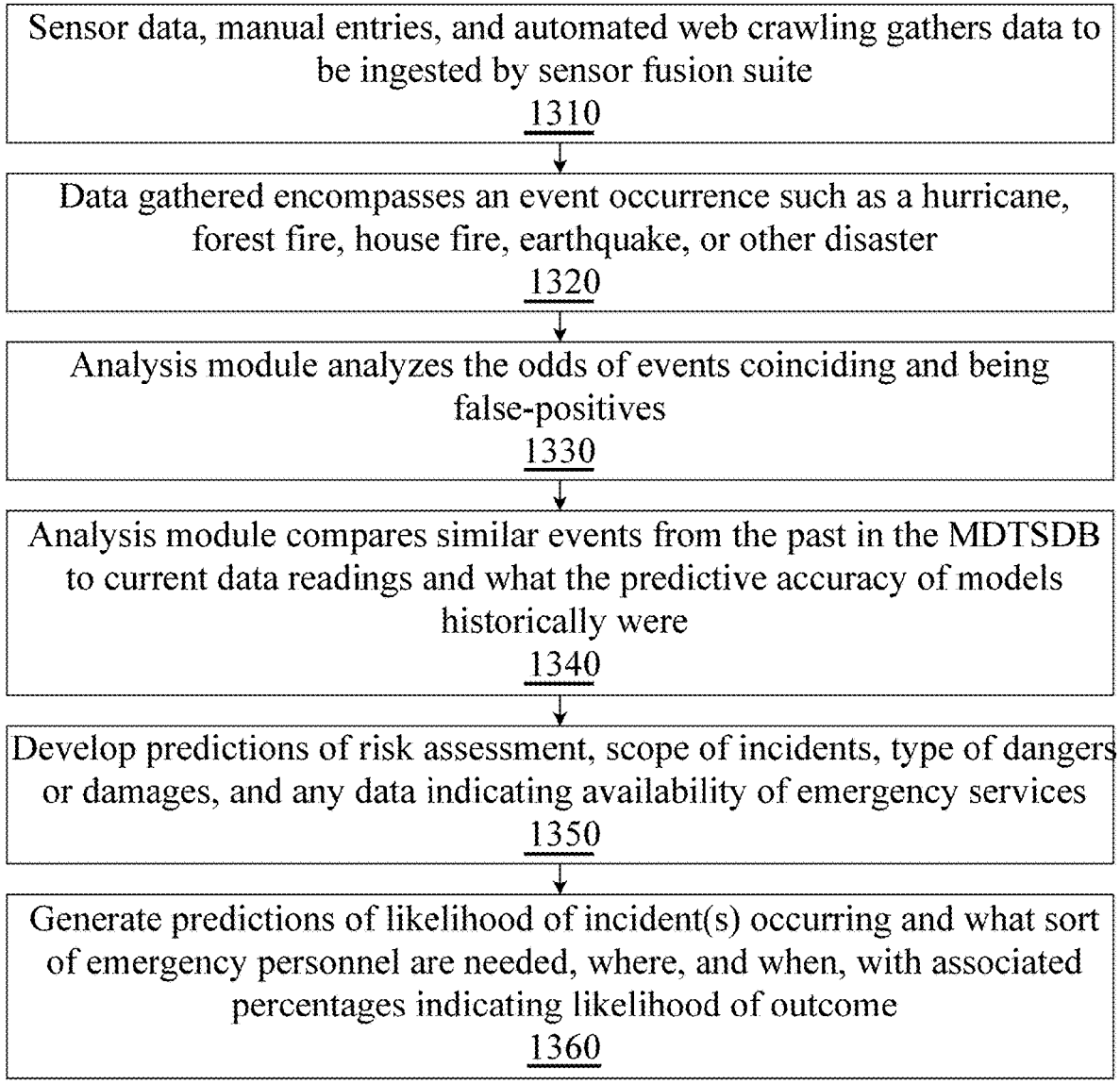
FIG. 13 is a method diagram illustrating an emergency response use-case of the system.

FIG. 13 is a method diagram illustrating an emergency response use-case of the system. First, sensor data, manual entries, and automated web crawling components gather data to be ingested by sensor fusion suite 1310, either through active polling of data sources or by data sources sending data actively to the sensor fusion suite. Data gathered will encompass an event occurrence or occurrences such as a hurricane, forest fire, house fire, earthquake, or other disaster or insurance-claimable event 1320, allowing an analysis module to analyze the probability of events coinciding and being false-positives 1330 given historical or newly developed event modelling. Machine learning techniques such as supervised neural networks may be used in an analysis module to compare similar events from the past in the MDTSDB to current data readings and what the predictive accuracy of models historically were 1340, to produce gradually more and more accurate models for varying sets of data. Using the developed models to predict events based on data input from sensors, Internet sources, and manually entered data, the system must then develop predictions of risk assessment, scope of incidents, type of dangers or damages, and any data indicating availability of emergency services 1350, for instance by normalization of data a neural network can be devised with the proper inputs to predict a forest fire in an area and the rate of spread of the fire, allowing the system to generate predictions of the likelihood of incident(s) occurring and what sort of emergency personnel are needed, where, and when, with associated percentages indicating likelihood of outcome 1360.

Figure 14:
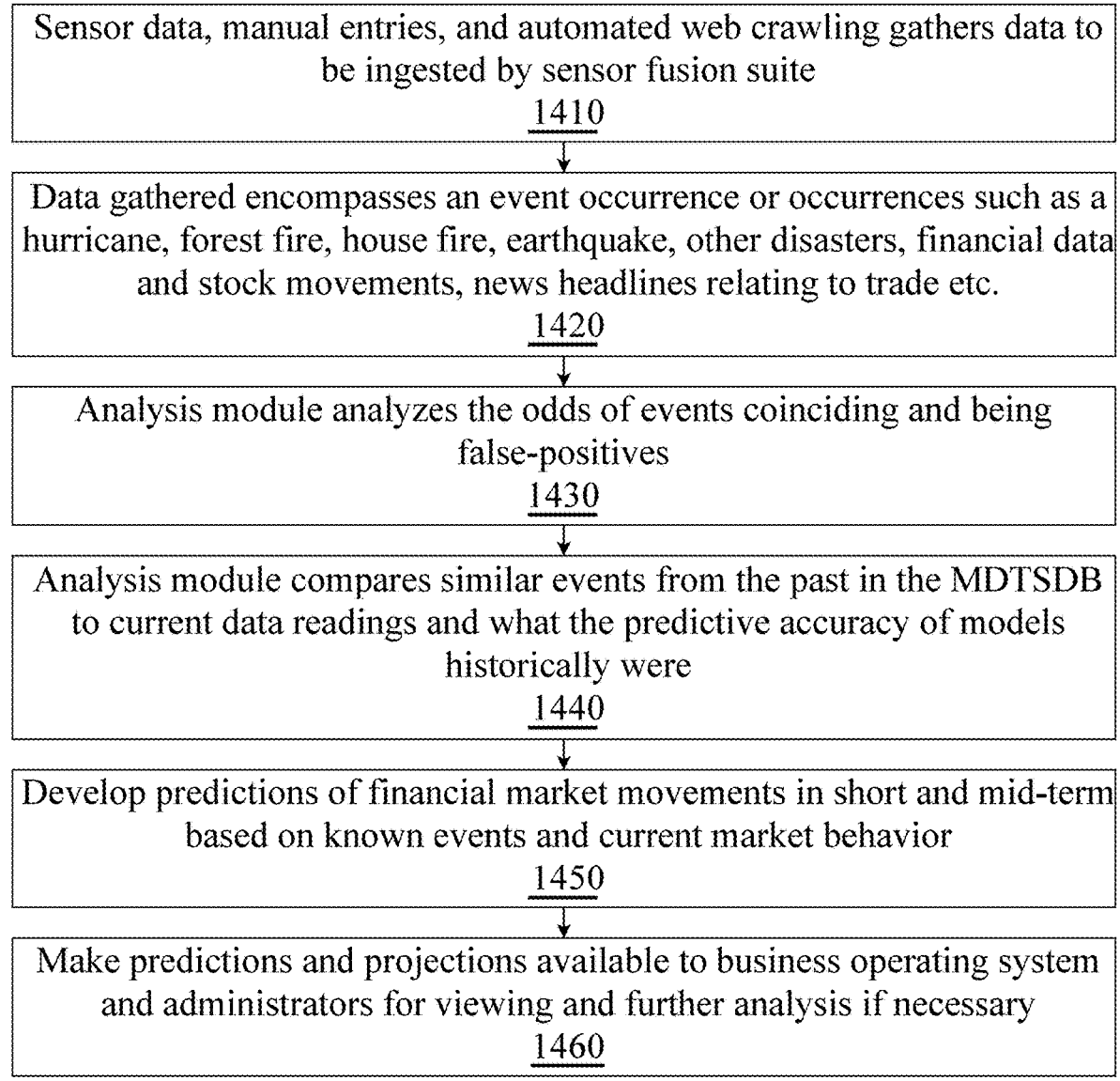
FIG. 14 is a method diagram illustrating a financial market trading use-case of the system.

FIG. 14 is a method diagram illustrating a financial market trading use-case of the system. First, sensor data, manual entries, and automated web crawling components gather data to be ingested by sensor fusion suite 1410, either through active polling of data sources or by data sources sending data actively to the sensor fusion suite. Data gathered will encompass an event occurrence or occurrences such as a hurricane, forest fire, house fire, earthquake, other disasters, financial data and stock movements, news headlines relating to trade etc.1420, allowing an analysis module to analyze the probability of events coinciding and being false-positives 1430 given historical or newly developed event modelling. Machine learning techniques such as supervised neural networks may be used in an analysis module to compare similar events from the past in the MDTSDB to current data readings and what the predictive accuracy of models historically were 1440, to produce gradually more and more accurate models for varying sets of data. The method in this embodiment then proceeds to develop predictions of financial market movements in the short and mid-term based on known events and current market behavior 1450, in a similar fashion to predicting possible natural disasters in other embodiments. When utilized or financial market predictions, the system then makes predictions and projections available to the business operating system and administrators for viewing and further analysis if necessary 1460.

Figure 15:
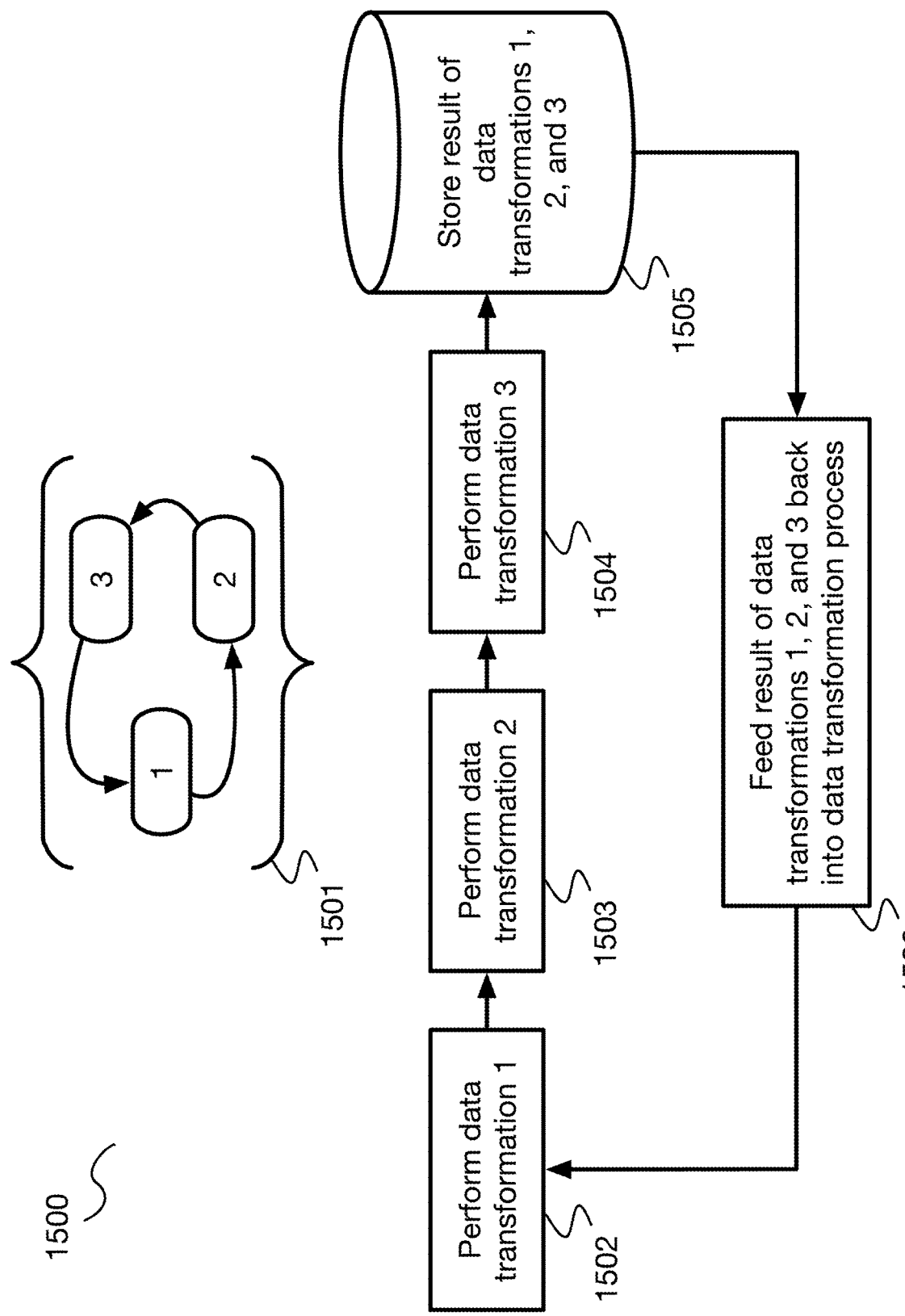
FIG. 15 is a process flow diagram of a method for processing a set of three or more data transformations within a data transformation pipeline where output of the last member transformation of the set serves as input of the first member transformation thereby creating a cyclical relationship according to one aspect.

FIG. 15 is a process flow diagram of a method 1500 for one aspect of a transformation pipeline where the topology of all or part of the pipeline is cyclical 1501. In this configuration, the output stream of one transformation node 1504 acts as an input of an antecedent transformation node within the pipeline 1502 serialization or decomposition linearizes this cyclical configuration by completing the transformation of all of the nodes that make up a single cycle 1502, 1503, 1504 and then storing the result of that cycle in a data store 1505. That result of a cycle is then reintroduced to the transformation pipeline as input 1506 to the first transformation node of the cycle. As this configuration is by nature recursive, special programming to unfold the recursions was developed for the invention to accommodate it. The example depicted in this diagram was chosen to convey the configuration of transformation pipelines with individual transformation nodes that for a cyclical configuration 1501, 1502, 1503, 1504 and is the simplest form of the configuration felt to show the point. It in no way implies limitation of the invention. One knowledgeable in the art will realize the great number of permutations and topologies possible, especially as the invention places no design restrictions on the number of transformation nodes participating in a cycle nor the number of cycles in a transformation pipeline.

Figure 20:
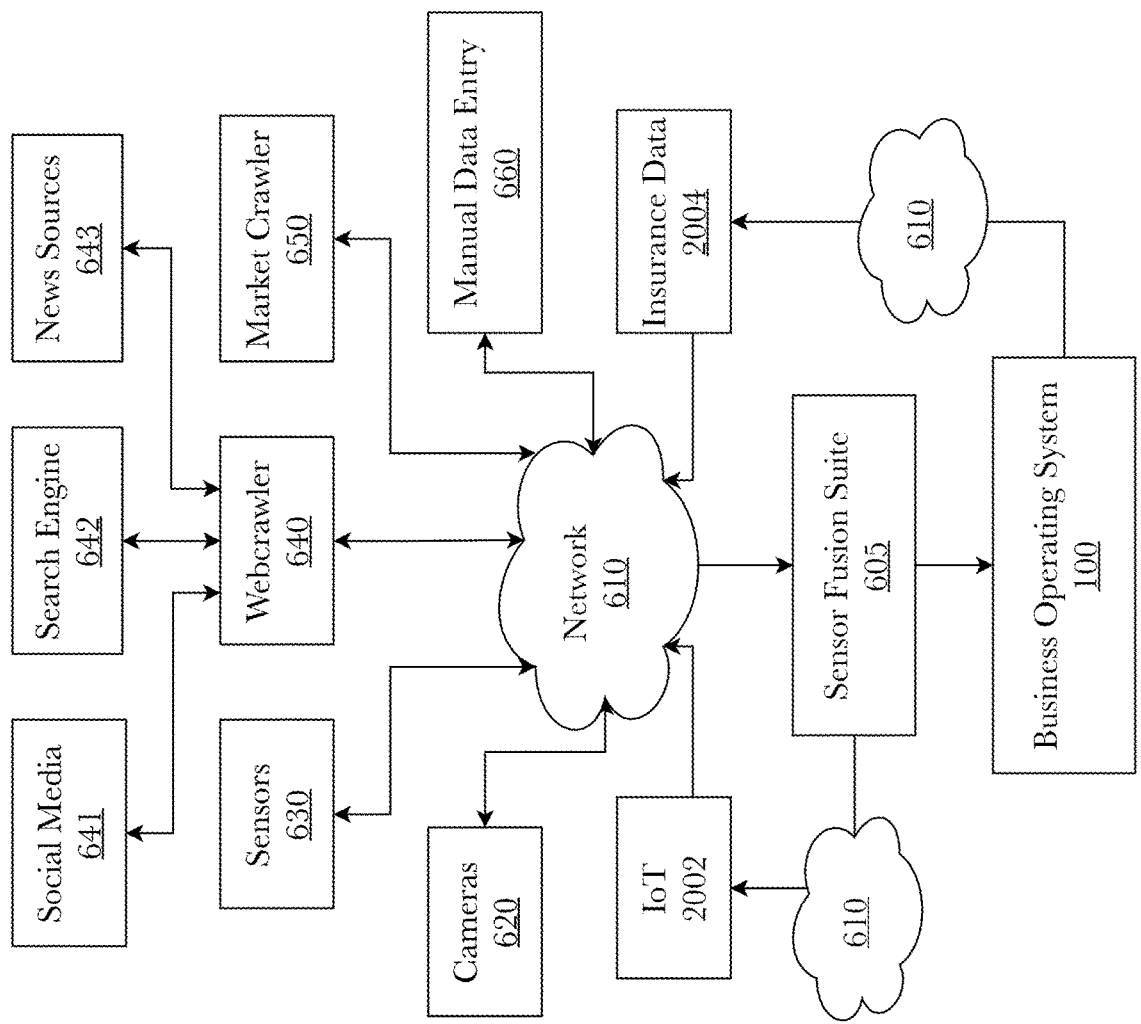
FIG. 20 is a system diagram showing additional heterogeneous data sources connected through a network to a sensor fusion suite which is further connected to a business operating system, according to an embodiment.

FIG. 20 is a system diagram showing additional heterogeneous data sources connected through a network to a sensor fusion suite which is further connected to a business operating system, according to an embodiment. According to this embodiment, data from Internet of Things devices (IoT) 2002 and insurance data 2004 are additionally supported as input into a sensor fusion suite 605. Additional aspects of this embodiment include the ability to send feedback to devices over a network 610 based on the analysis performed in the sensor fusion suite 605. Although the diagram shows feedback returning to IoT devices 2002 it does not necessarily have to go to IoT devices 2002 and may go to any electronic device. Examples of this will be disclosed in the following figures. Additionally, the business operating system 100 may return data gathered by the sensor fusion suite 605 to external-partnered insurance companies 2004. For example, if one insurance company gathers significantly relevant data of a partner insurance company's customer, then one insurance company may send that data to the other insurance company, potentially for a fee. Another example is there may be a federated database of insurance data 2004 that can be shared amongst all insurance companies and other interested parties.

Figure 21:
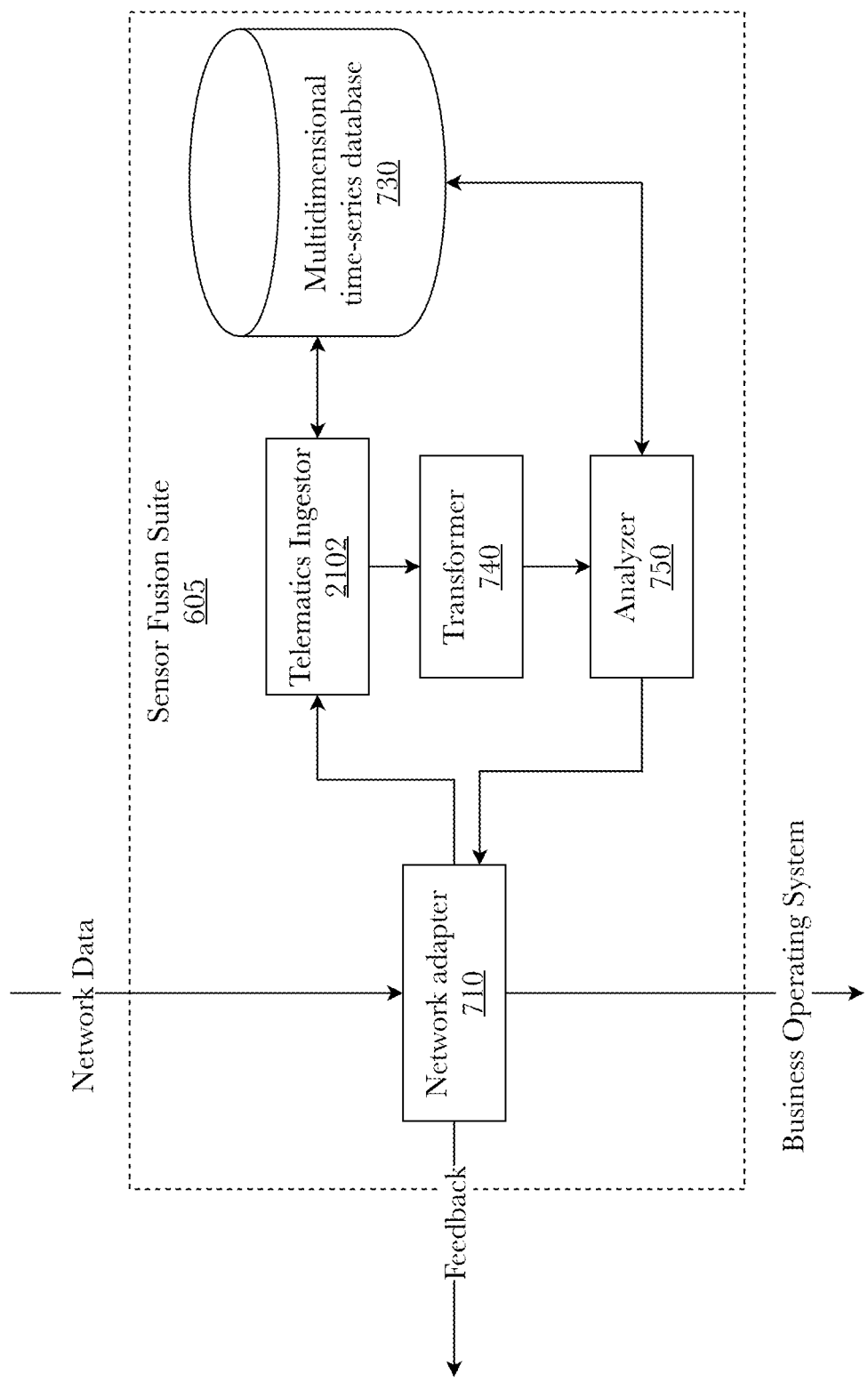
FIG. 21 is a system diagram of a sensor fusion suite comprising a telematics ingestor, according to an embodiment.
Figure 22:
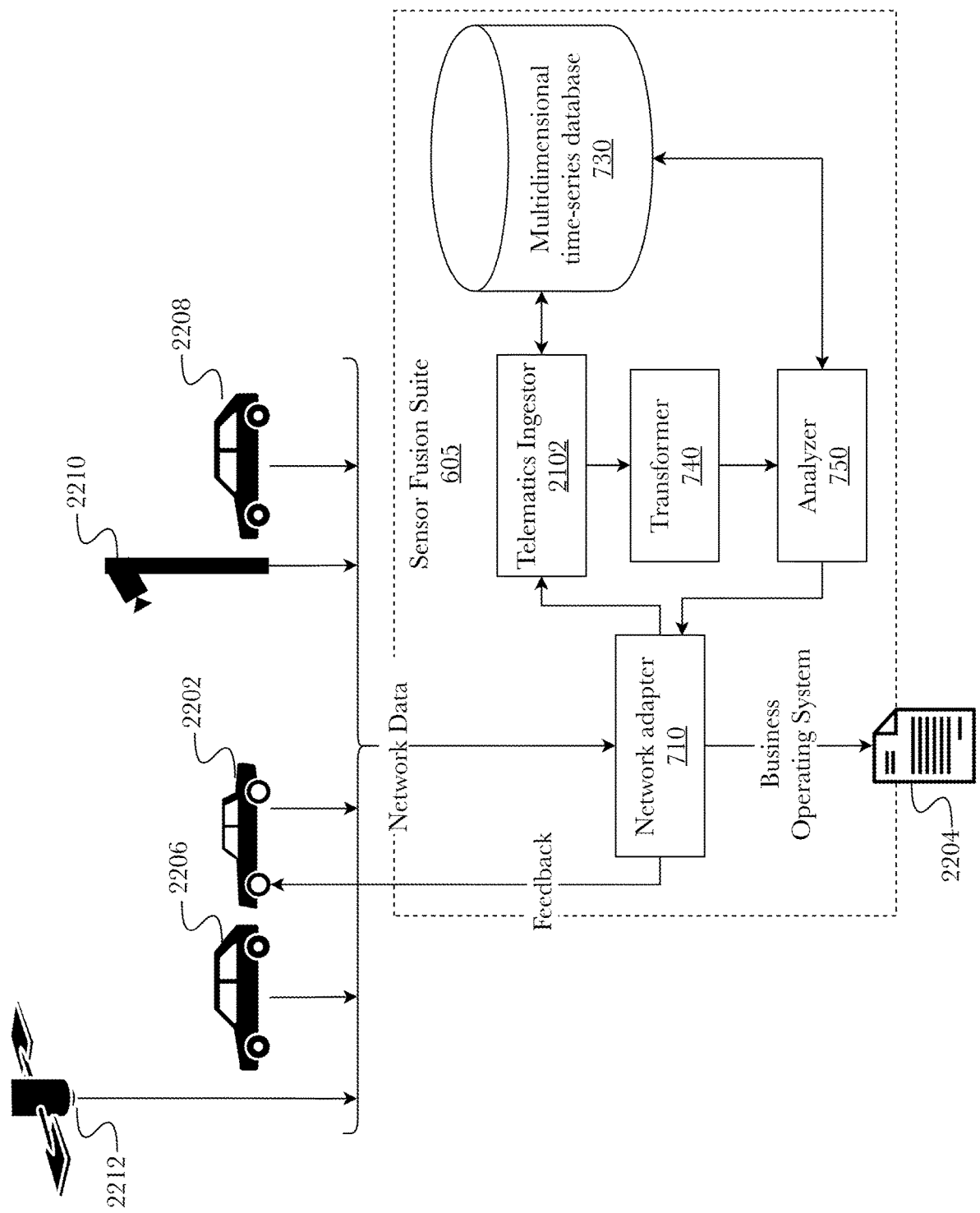
FIG. 22 is an exemplary use of a sensor fusion suite comprising a telematics ingestor, according to an embodiment.

FIG. 21 is a system diagram of a sensor fusion suite comprising a telematics ingestor 2102, where FIG. 22 is an exemplary use of the sensor fusion suite comprising a telematics ingestor 2102. According to one embodiment, a system for crowdsensing-based insurance premiums, comprises a plurality of network-connected physical sensors providing at least a part of the network data, and a sensor fusion suite 605. Sensors may be vision and imaging sensors, temperature sensors, radiation sensors, proximity sensors, pressure sensors, position sensors, photoelectric sensors, particle sensors, motion sensors, metal sensors, level sensors, leak sensors, humidity sensors, gas and chemical sensors, force sensors, flow sensors, flaw sensors, flame sensors, electrical sensors, contact sensors, and non-contact sensors. The telematics ingestor 2102 automatically gathers telematics data from the plurality of network-connected physical sensors while the sensor fusion suite 605 records the telematics data and the time of receipt in a multidimensional time-series database stored on a non-volatile data storage device. A model based on previously collected and analyzed data is retrieved from the non-volatile data storage device for the prediction of a probability of a future event from the received data. A distributed computational graph module receives the model and the telematics data for processing from the sensor fusion suite 605, whereby the distributed computational graph module constructs a distributed computational graph from the model, the distributed computational graph representing a data processing workflow and comprising a directed graph with nodes representing data transformations and edges representing messaging between the nodes. The telematics data is processed according to the data processing workflow of the distributed computational graph and is then used by the sensor fusion suite 605 to predict the probability of a future event. The future event, or the probability thereof, is used to determine a premium for an insurance product based on at least the probability of the future event and generate a remedial action based at least in part on the probability of the future event and transmit the remedial action to a notification device so that the insured individual has an opportunity to remedy to infraction before an increase in his or her premium is instituted. The sensor fusion suite 605 will determine rectification of the infraction by comparing between the remedial action and the updated telematics data. For example, a smart plug may report a near-maxxed electrical load within a house, and the home insurance provider may email the customer to distribute the electrical load more efficiently within some time frame or face an increase in premium. Or, alert a driver to obey the speed limit or also face an increase in his or her premium, as monitored by a telematics devices or a plurality of crowdsensed devices. It is not a requirement that a notification is sent, dependent on the policies and business model of the insurance provider.

In FIG. 22, the example is using crowdsensing to dynamically determine insurance policies for automobiles. In this example, automobile A 2202 has a dynamic insurance policy 2204 with an insurance company. Dictated by the insurance company, it may be the case that automobile A 2202 must have installed a telematics device which at least monitors speed, breaking, turning data, etc., as well as a notification device that will notify the driver if their driving behavior well result in an increase or decrease in their insurance premium. A notification device may comprise a message that pops up on automobile A's 2202 in-dash unit, or a buzzer device, or some other device possibly placed on the dash with lights or a text display, or it may send push notifications to the driver's phone, and examples of the like.

Still, in this scenario there are two other vehicles 2206/2208 traveling down the same interstate as vehicle A 2202, and there is an Interstate camera 2210 and some or all of the vehicles 2202/2206/2208 are utilizing GPS 2212. Also, in this scenario, the vehicles 2206/2208 may be equipped with cameras, distance sensors, automated driver technologies, and other electronic telematic devices that are able to transmit telematics data to a telematics ingestor 2102, i.e., crowdsensed telematics data. Now imagine, automobile A 2202 is not reporting any risky behavior—e.g., going the speed limit, etc.—and that may be because the vehicle is not equipped with any distance sensors therefore the insurance company does not know that automobile A 2202 is tailgating automobile B 2206. However, ingesting telematics data from cameras 2210, GPS systems 2212, and other vehicles 2206/2208 (in this case the other vehicles 2206/2208 identifying the at risk vehicle 2202—via distance sensors and onboard cameras and reporting the at-risk vehicle 2202—capturing the license plate number) allows the sensor fusion suite 605 to analyze the risk, and send a notification, i.e., feedback, to the notification device in automobile A 2202. Rules may be put into place where the rules dictate whether to immediately increase the premium or to wait some amount of time after a notification is sent to see if the at-risk behavior has been rectified. In another embodiment automobile A 2202 does not have a notification device and their premium is adjusted upon detection of their at risk behavior from the crowdsensed telematics data.

Another example using the claimed invention comprises monitoring electrical grids using telematics data in order for commercial insurance products to be dynamically provided to the utility company. Well-equipped smart homes may also provide enough telematics data to dynamically adjust home insurance premiums for homeowners as well. A fourth example comprises providing dynamic insurance policies during public and private events. Take for example, a music festival. A bespoke application may be developed for the festival, where in a majority of the attendees have the bespoke application installed and where the application allows access to the devices' sensors and reports that information to the telematics ingestor 2102. Further consider that there may be cameras, motion sensors, and even manually entered data from the event host that can be ingested as well. Past events and prior insurance claims of the insured entity and other entities in the same domain may also be used to determine dynamic policies. Ingesting the plurality of telematics data and supplemental "big data" may allow the sensor fusion suite 605 to determine how rowdy a crowd is, the risk of incidents, ongoing incidents, etc. and dynamically update the insurance policy. Consider a fifth example, where industrial facilities and manufacturing plants report their telematics data to their insurance company which may be combined with weather data, electrical grid data, employee telematics data, etc. to allow for dynamic insurance premiums.

By utilizing crowdsensing-telematics data, the cost of determining policies is reduced and the efficiency is improved, especially when using machine learning and distributed computational graphs. With regards to the distributed computational graphs and the predictive qualities thereof, dynamic insurance premiums can be calculated in near real time providing a more substantial and thorough analysis and coverage for both insurance product consumers and providers.

Detailed Description of Exemplary Aspects

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs over a network or cloud 107 architecture through the system's distributed, extensible high bandwidth cloud interface 110 which uses a versatile, robust web application driven interface for both input and display of client-facing information and a data store 112 such as, but not limited to MONGODB™, COUCHDB™ CASSANDRA™ or REDIS™ depending on the embodiment. Much of the business data analyzed by the system both from sources within the confines of the client business, and from cloud based sources, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is in no way not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to enterprise network usage data, component and system logs, performance data, network service information captures such as, but not limited to news and financial feeds, and sales and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. The using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

Figure 2:
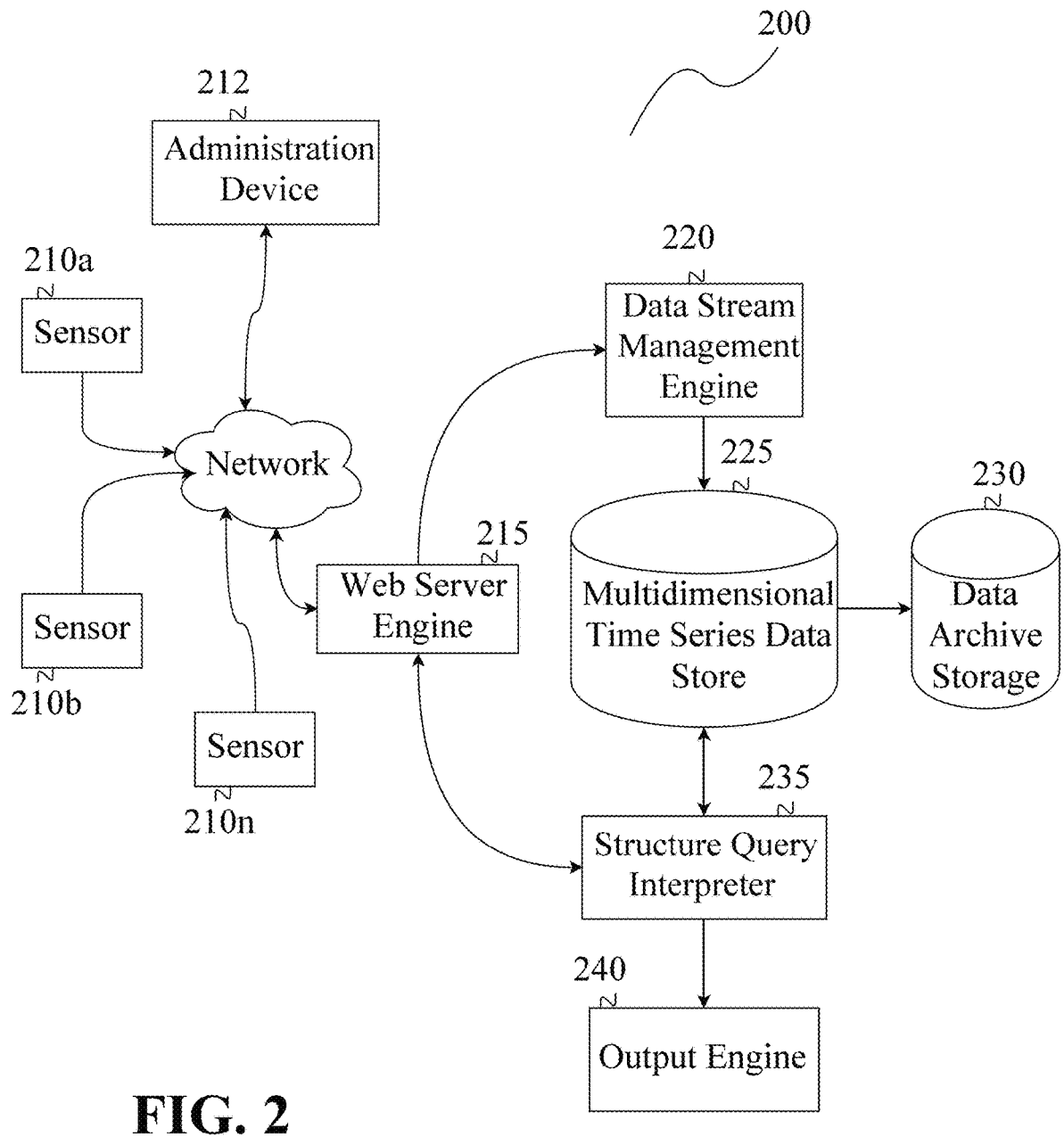
FIG. 2 is a diagram of an exemplary architecture of a system for the capture and storage of time series data from sensors with heterogeneous reporting profiles according to an embodiment of the invention.

For example, the Information Assurance department is notified by the system 100 that principal X is using credentials K (Kerberos Principal Key) never used by it before to access service Y. Service Y utilizes these same credentials to access secure data on data store Z. This correctly generates an alert as suspicious lateral movement through the network and will recommend isolation of X and Y and suspension of K based on continuous baseline network traffic monitoring by the multidimensional time series data store 120 programmed to process such data 120a, rigorous analysis of the network baseline by the directed computational graph 155 with its underlying general transformer service module 160 and decomposable transformer service module 150 in conjunction with the AI and primed machine learning capabilities 130a of the automated planning service module 130 which had also received and assimilated publicly available from a plurality of sources through the multi-source connection APIs of the connector module 135. Ad hoc simulations of these traffic patterns are run against the baseline by the action outcome simulation module 125 and its discrete event simulator 125a which is used here to determine probability space for likelihood of legitimacy. The system 100, based on this data and analysis, was able to detect and recommend mitigation of a cyberattack that represented an existential threat to all business operations, presenting, at the time of the attack, information most needed for an actionable plan to human analysts at multiple levels in the mitigation and remediation effort through use of the observation and state estimation service 140 which had also been specifically preprogrammed to handle cybersecurity events 140b FIG. 2 is a diagram of an exemplary architecture of a system for the capture and storage of time series data from sensors with heterogeneous reporting profiles according to an embodiment of the invention 200. In this embodiment, a plurality of sensor devices 210a-n stream data to a collection device, in this case a web server acting as a network gateway 215. These sensors 210a-n can be of several forms, some non-exhaustive examples being: physical sensors measuring humidity, pressure, temperature, orientation, and presence of a gas; or virtual such as programming measuring a level of network traffic, memory usage in a controller, and number of times the word "refill" is used in a stream of email messages on a particular network segment, to name a small few of the many diverse forms known to the art. In the embodiment, the sensor data is passed without transformation to the data management engine 220, where it is aggregated and organized for storage in a specific type of data store 225 designed to handle the multidimensional time series data resultant from sensor data. Raw sensor data can exhibit highly different delivery characteristics. Some sensor sets may deliver low to moderate volumes of data continuously. It would be infeasible to attempt to store the data in this continuous fashion to a data store as attempting to assign identifying keys and the to store real time data from multiple sensors would invariably lead to significant data loss. In this circumstance, the data stream management engine 220 would hold incoming data in memory, keeping only the parameters, or "dimensions" from within the larger sensor stream that are pre-decided by the administrator of the study as important and instructions to store them transmitted from the administration device 212. The data stream management engine 220 would then aggregate the data from multiple individual sensors and apportion that data at a predetermined interval, for example, every 10 seconds, using the the timestamp as the key when storing the data to a multidimensional time series data store over a single swimlane of sufficient size. This highly ordered delivery of a foreseeable amount of data per unit time is particularly amenable to data capture and storage but patterns where delivery of data from sensors occurs irregularly and the amount of data is extremely heterogeneous are quite prevalent. In these situations, the data stream management engine cannot successfully use strictly single time interval over a single swimlane mode of data storage. In addition to the single time interval method the invention also can make use of event based storage triggers where a predetermined number of data receipt events, as set at the administration device 212, triggers transfer of a data block consisting of the apportioned number of events as one dimension and a number of sensor ids as the other. In the embodiment, the system time at commitment or a time stamp that is part of the sensor data received is used as the key for the data block value of the value-key pair. The invention can also accept a raw data stream with commitment occurring when the accumulated stream data reaches a predesigned size set at the administration device 212.

It is also likely that that during times of heavy reporting from a moderate to large array of sensors, the instantaneous load of data to be committed will exceed what can be reliably transferred over a single swimlane. The embodiment of the invention can, if capture parameters pre-set at the administration device 212, combine the data movement capacity of two or more swimlanes, the combined bandwidth dubbed a metaswimlane, transparently to the committing process, to accommodate the influx of data in need of commitment. All sensor data, regardless of delivery circumstances are stored in a multidimensional time series data store 225 which is designed for very low overhead and rapid data storage and minimal maintenance needs to sap resources. The embodiment uses a key-value pair data store examples of which are Riak, Redis and Berkeley DB for their low overhead and speed, although the invention is not specifically tied to a single data store type to the exclusion of others known in the art should another data store with better response and feature characteristics emerge. Due to factors easily surmised by those knowledgeable in the art, data store commitment reliability is dependent on data store data size under the conditions intrinsic to time series sensor data analysis. The number of data records must be kept relatively low for the herein disclosed purpose. As an example one group of developers restrict the size of their multidimensional time series key-value pair data store to approximately $8.64 \times 20^4$ records, equivalent to 24 hours of 1 second interval sensor readings or 60 days of 1 minute interval readings.

In this development system the oldest data is deleted from the data store and lost. This loss of data is acceptable under development conditions but in a production environment, the loss of the older data is almost always significant and unacceptable. The invention accounts for this need to retain older data by stipulating that aged data be placed in long term storage. In the embodiment, the archival storage is included 230. This archival storage might be locally provided by the user, might be cloud based such as that offered by Amazon Web Services or Google or could be any other available very large capacity storage method known to those skilled in the art.

Reliably capturing and storing sensor data as well as providing for longer term, offline, storage of the data, while important, is only an exercise without methods to repetitively retrieve and analyze most likely differing but specific sets of data over time. The invention provides for this requirement with a robust query language that both provides straightforward language to retrieve data sets bounded by multiple parameters, but to then invoke several transformations on that data set prior to output. In the embodiment isolation of desired data sets and transformations applied to that data occurs using pre-defined query commands issued from the administration device 212 and acted upon within the database by the structured query interpreter 235. Below is a highly simplified example statement to illustrate the method by which a very small number of options that are available using the structured query interpreter 235 might be accessed, before being sent to an output engine 240 for outputting as necessary.

SELECT [STREAMING|EVENTS] data_spec FROM [unit] timestamp TO timestamp GROUPBY (sensor_id, identifier) FILTER [filter_identifier] FORMAT [sensor [AS identifier] [, sensor [AS identifier]] . . . ] (TEXT|JSON-|FUNNEL|KML|GEOJSON|TOPOJSON);

Here "data_spec" might be replaced by a list of individual sensors from a larger array of sensors and each sensor in the list might be given a human readable identifier in the format "sensor AS identifier". "unit" allows the researcher to assign a periodicity for the sensor data such as second (s), minute (m), hour (h). One or more transformational filters, which include but a not limited to: mean, median, variance, standard deviation, standard linear interpolation, or Kalman filtering and smoothing, may be applied and then data formatted in one or more formats examples of with are text, JSON, KML, GEOJSON and TOPOJSON among others known to the art, depending on the intended use of the data.

Figure 5:
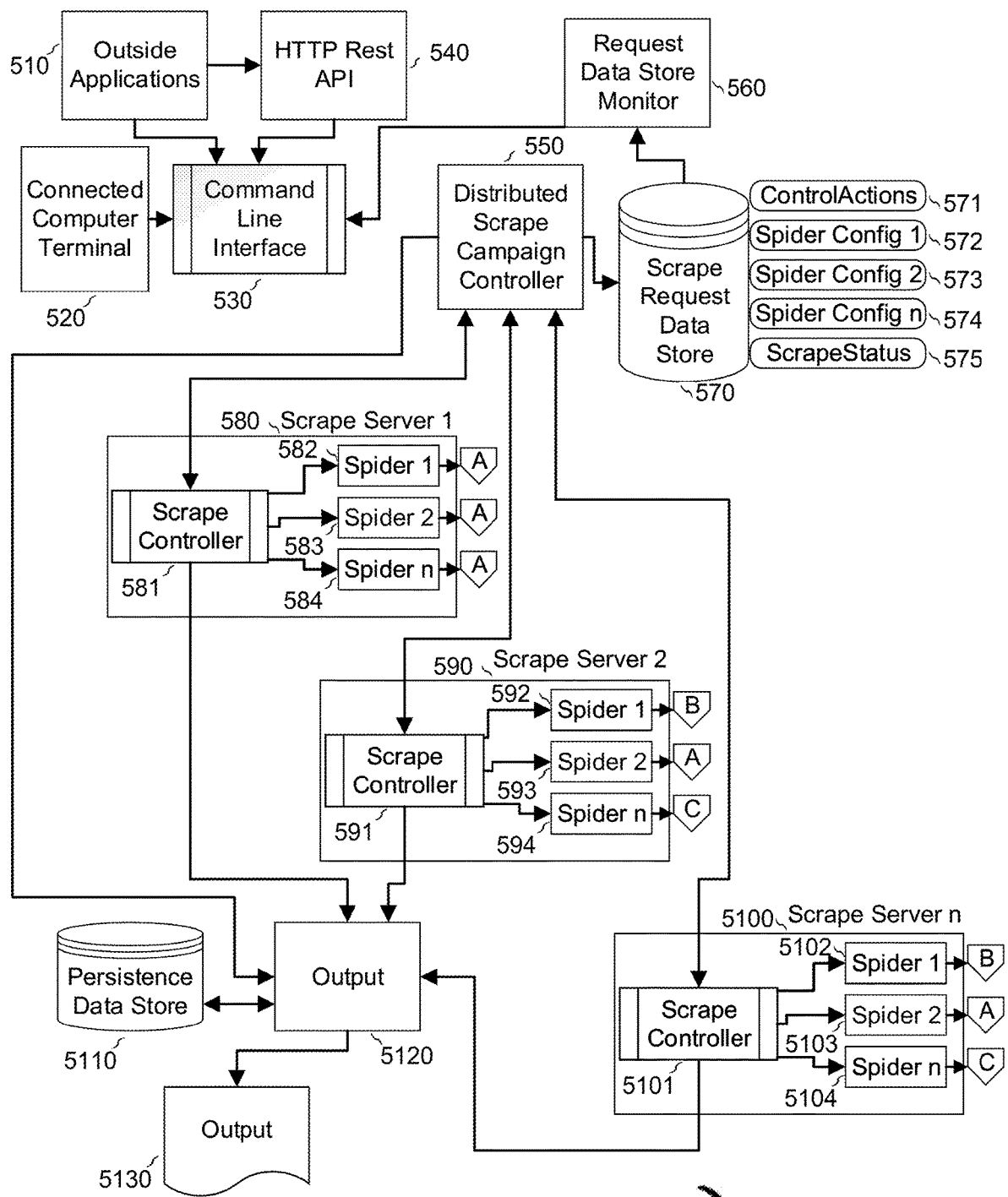
FIG. 5 is a diagram of an exemplary architecture of a distributed system for rapid, large volume, search and retrieval of unstructured or loosely structured information found on sources such as the World Wide Web according to an embodiment of the invention.

FIG. 5 is a diagram of an exemplary architecture of a distributed system 500 for rapid, large volume, search and retrieval of unstructured or loosely structured information found on sources such as the World Wide Web, according to a preferred embodiment of the invention. According to the embodiment, scrape campaign requests, which are comprised of a plurality of scrape agent (spider) configuration parameters as well as scrape campaign control directives, may be entered from a connected computer terminal 520 or by terminal-like commands issued by external software applications 510 using a built in command line interface 530. Alternatively, similar scrape campaign requests may enter the system through an HTTP REST-based API using JSON-compliant instructions 540. Scrape campaign parameters enter a distributed scrape campaign controller module 550, where they are formalized and stored in a scrape request data store 570 as one or more scrape campaign-related spider configurations 572, 573, 574 and associated scrape campaign control directives 571. Scrape campaigns remain persistently stored 560 until a command to run one or more of them is received through command line interface 530 or HTTP-based API 540, at which time request parameters 571, 572, etc. for a campaign are retrieved by distributed scrape campaign controller module 550 from scrape request data store 570. Persistent storage of scrape campaign request parameters also allows the same scrape campaign to be run multiple times and used as a starting point for design of similar scrape campaigns. Upon receipt of a command to run a specific scrape campaign and retrieval of that scrape campaign's configuration and control parameters, distributed scrape campaign controller module 550 coordinates the scrape campaign in regards to the number of spiders 582, 583, 584 to be used, and the number of distributed scrape servers 580, 590, 5100 to be used based upon the control directives for that campaign. Distributed scrape campaign controller module 550 then sends appropriate instructions to scrape servers 580, 590, 5100 to initiate and run the requested scrape campaign. If there are multiple spider configurations present in a scrape campaign request so as to cause the scraping of multiple web pages or sites 600, how many spiders to assign to each page and the priority each spider type has for scrape server resources is also coordinated by distributed scrape campaign controller module 550, which directs the scrape servers 580, 590, 5100 accordingly to initiate and run the requested multipage or multisite scrape campaign. Once the data to run a scrape campaign is sent to it, scrape controller module 581, 591, 5101 of each scrape server 580, 590, 5110 executes the required scrapes. Scrape controller module 580 590, 5110 hosts the programming for the spiders into which it loads scrape campaign spider configuration parameters sent to scrape server 580, 590, 5110 from distributed scrape campaign controller module 550 using the co-sent scrape campaign control directives to determine the number of spider instances 582, 583, 584 to create and the resource usage priority each spider is given on the server. It is possible that all spider 582, 583, 584 instances on a given scrape server 580 will be scraping the same web target 613; however, the invention does not require this and is instead set up to make efficient use of scrape server resources. Therefore, a single scrape server 590; 5110 may execute spiders scraping different web targets 592, 593, 594; 5102, 5103, 5104 and the spiders scraping a single web target 582, 583, 593; 592, 5102; 594, 5103 may be distributed across multiple servers 580; 590; 5100. Scrape controller module 581, 591, 5101 of each scrape server 580, 590, 5100 monitors the progress and operational status of the spiders it has executed and returns that information back to distributed scrape controller module 550. Both the progress and operational data is stored as log data 575 in scrape request store 570 and is made available to the authors of the scrape campaign during its operation, which may result in directives being issued that change one or more aspects of the scrape campaign. The invention is designed to allow such mid-campaign parameter changes without downtime or loss of collected, intermediate, data. Results of the scrapes returned to scrape controller module 581, 591, 5100 by individual spiders 582, 583, 584, 592, 593, 594, 5102, 5103, 5104 are sent to persistence service server 5120, which aggregates the data from individual scrape server spiders 582, 583, 584, 592, 593, 594, 5102, 5103, 5104, and performs any transformations pre-designed by the authors of the scrape campaign prior to outputting the data in a format determined by the authors of the campaign. This may involve sending the output to external software applications for further processing. The data may also be processed for storage by persistence service server 5120 and sent to a persistence data store for more permanent archival 5130.

It is should be noted that, while the core distributed scrape campaign system distributes load across a pool of scrape servers, coordinates the number of spiders employed within a scrape campaign, and prioritizes allotment of scrape server resources among spiders, it does not internally manage or control spider web page and link follow restrictions, crawling frequencies, and so forth. Individual spiders must implement suitable controls and crawling orchestration (which is external to the distributed scrape campaign system). All of these considerations are part of the scrape campaign spider configuration parameters that are received from the authors of scrape campaigns 510, 520 by distributed scrape campaign controller module 550. This is done to give the authors of the scrape maximal flexibility in the behavior of the spiders during a scrape campaign while allowing the use of a robust yet easily deployed spider programming interface.

Figure 6:
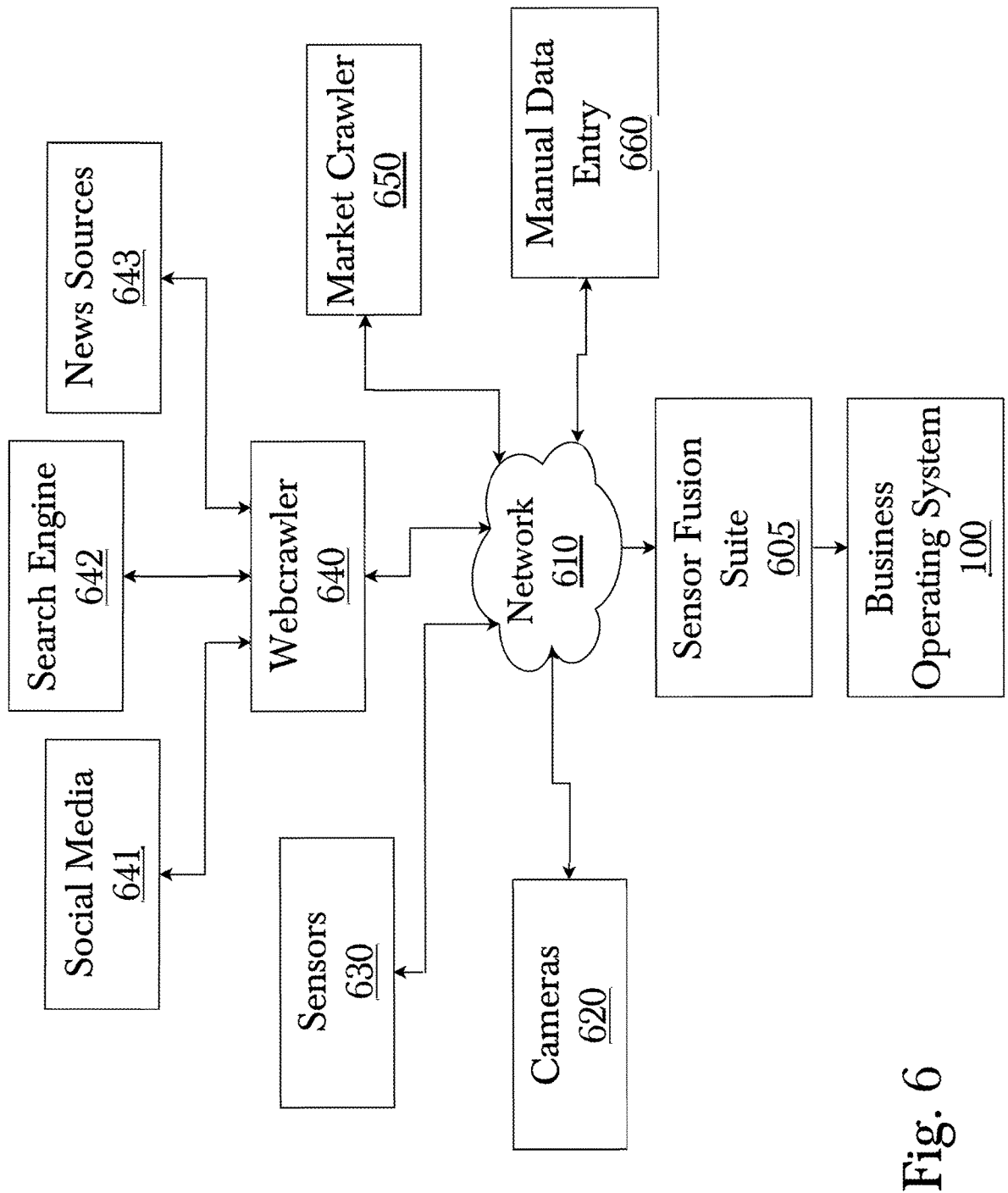
FIG. 6 is a system diagram showing heterogeneous data sources connected through a network to a sensor fusion suite which is further connected to a business operating system, according to an embodiment.

FIG. 6 is a system diagram showing heterogeneous data sources connected through a network to a sensor fusion suit which is further connected to a business operating system, according to an embodiment. A business operating system 100 connects to a sensor fusion suite 605, such a connection being in the form of a network connection over either wireless or wired LAN or WAN, including but not limited to the Internet. A sensor fusion suite 605 serves to perform initial ingestion, transformation, and analysis of incoming sensory data from a network 610 which may be a LAN, WAN, the Internet, or some other network. Sources of sensory data may be from network-connected cameras 620, physical sensors 630 including earthquake sensors or satellite sensors that may relay various readings of different kinds, a webcrawler 640 which may gather data from social media 641, a search engine or search engines 642, or news sources 643, or some other web-accessible source.

Other sources of sensor data include a market crawler 650 for financial market data gathering, and manual data inputs 660, which may include such things as users manually typing database entries or queries into an online portal, or individuals reporting events as they happen on the ground during disasters using a specific portal or a generalized portal, or any other manual entry of data. These sources may all be both polled actively by a sensor fusion suite 605 or may send their data to a sensor fusion suite 605 themselves over a network 610.

Figure 7:
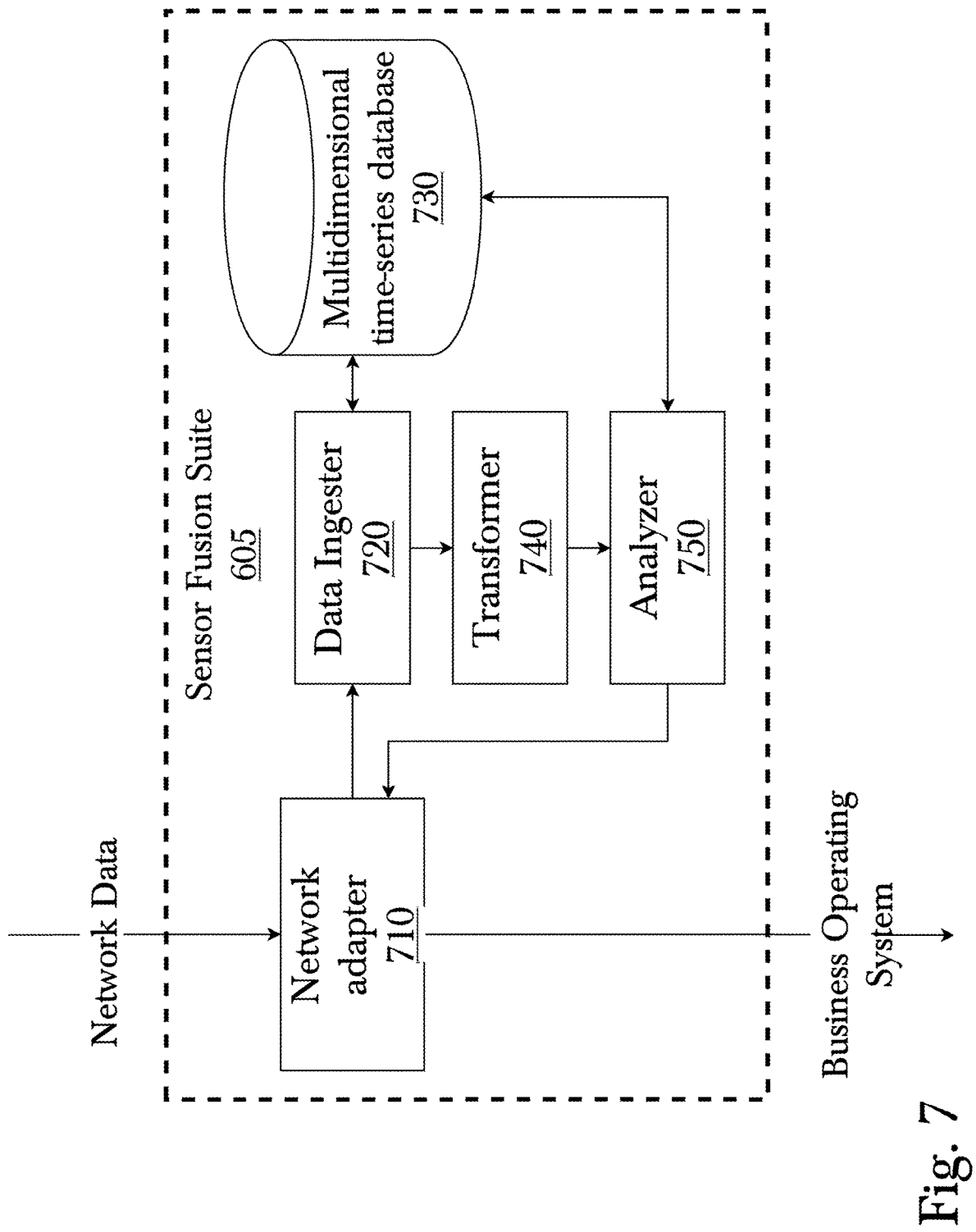
FIG. 7 is a system diagram of a sensor fusion suite, according to an embodiment.

FIG. 7 is a system diagram of a sensor fusion suite 605, according to an embodiment. A network adapter 710 allows the sensor fusion suite 605 to connect to a network and gather data from sources including physical sensors, webcrawling, and more, and communicate with internal components comprising a data ingestor 720 and data analyzer 750. A data ingestor 720 communicates further with a multidimensional time-series database (MDTSDB) 730, and a data transformer 740, sending any received data and included metadata as necessary to the MDTSDB for storage and marking with the time the data matches, and the same data being sent to a data transformer 740, where transformation including stripping of extraneous data, stripping of data formatting that is no longer relevant, stripping of data that is malformed or corrupted, or normalizing of ingested data, before sending the data with any transformations to a data analysis component 750. A data analyzer 750 takes the data after any transformations are applied (if any are applied) and may draw correlations between datapoints and sensor input, draw on past data and models from the MDTSDB 730, and develop models for predicting other data values or future data values, using machine learning techniques such as unsupervised neural networks. For instance, transformed data may include normalized inputs from house fire alarms in a neighborhood, news sources indicating a fire in the neighborhood happened, and webcrawling that indicates the average worth of homes in the neighborhood, to result in statistical predictions of what possible damages an insurance provider may incur, compared with past events and predictions if possible so as to train a more accurate data prediction analysis. This analysis is then sent both to the MDTSDB 730 and the network adapter 710 to be sent to a business operating system for any viewing or further processing or storage.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 16:
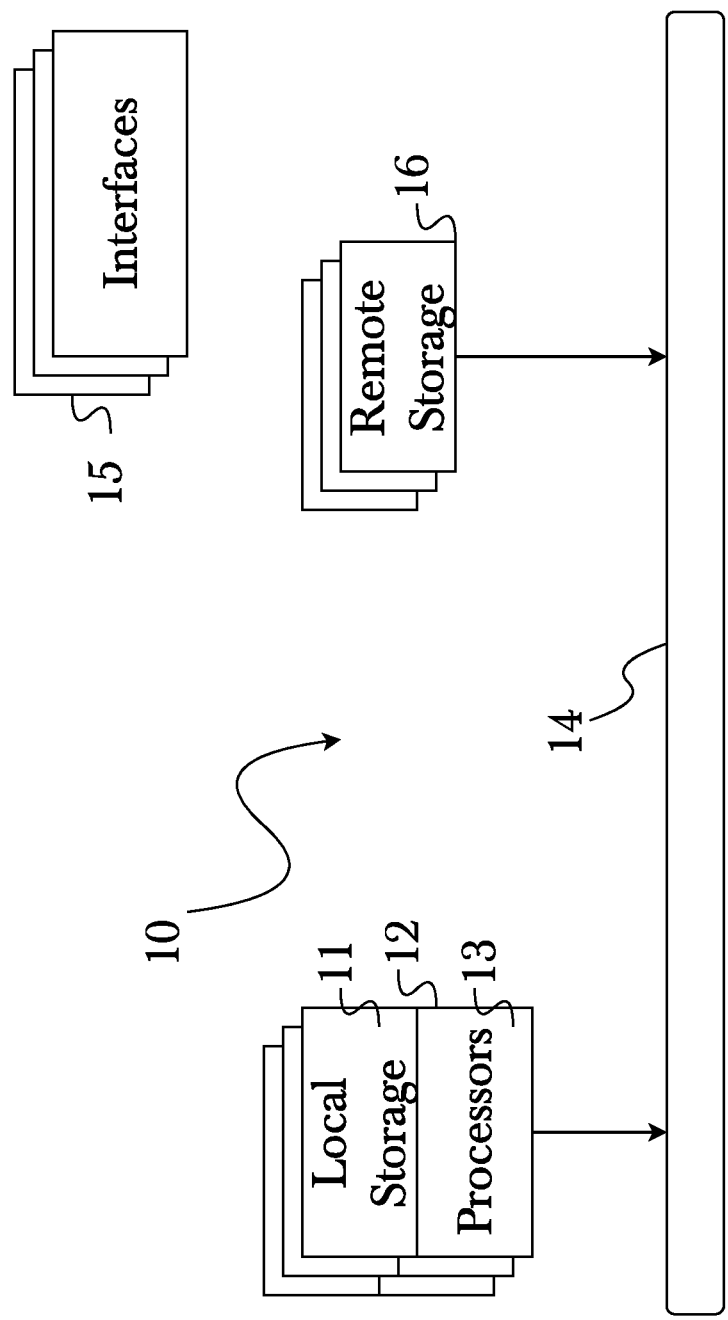
FIG. 16 is a block diagram illustrating an exemplary hardware architecture of a computing device.

Referring now to FIG. 16, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 16 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 17:
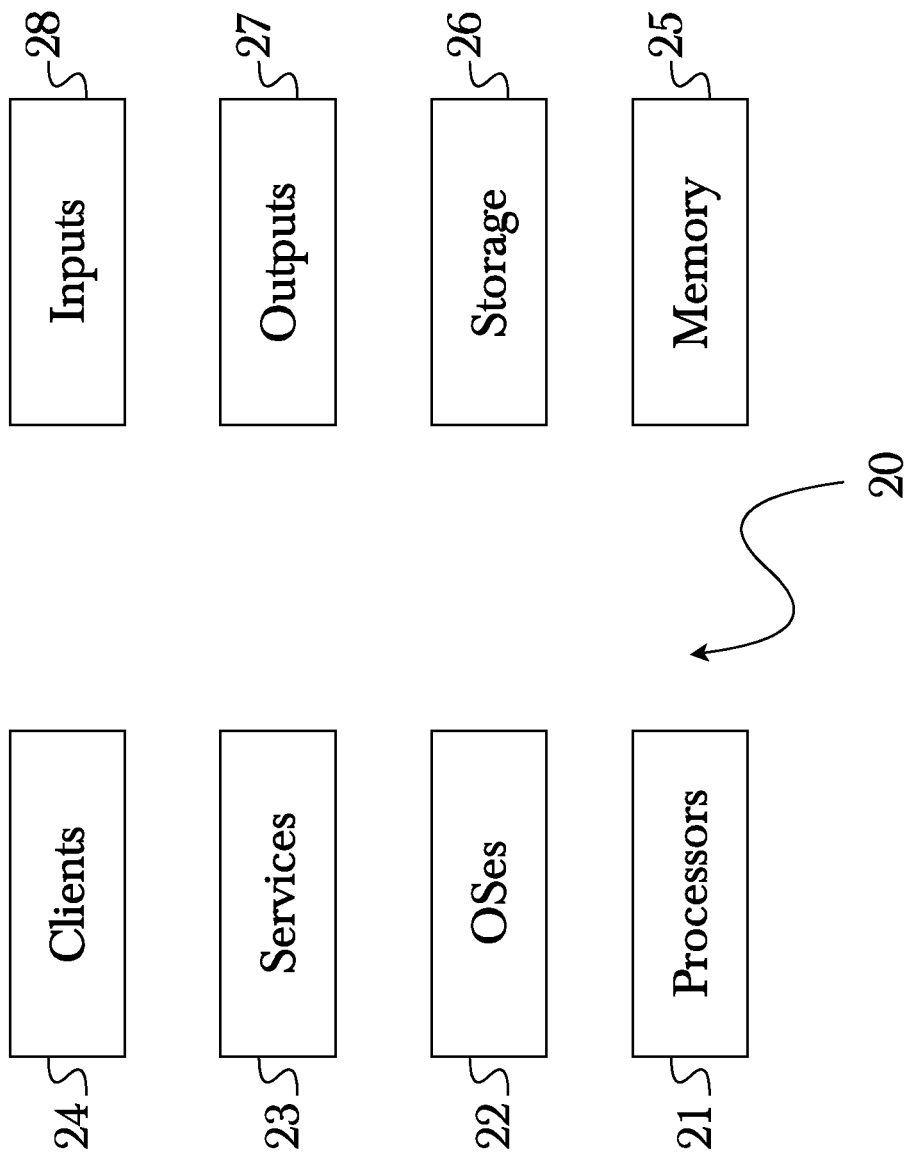
FIG. 17 is a block diagram illustrating an exemplary logical architecture for a client device.

In some aspects, systems may be implemented on a standalone computing system. Referring now to FIG. 17, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 16). Examples of storage devices 26 include flash memory, magnetic hard drive, CD-ROM, and/or the like.

Figure 18:
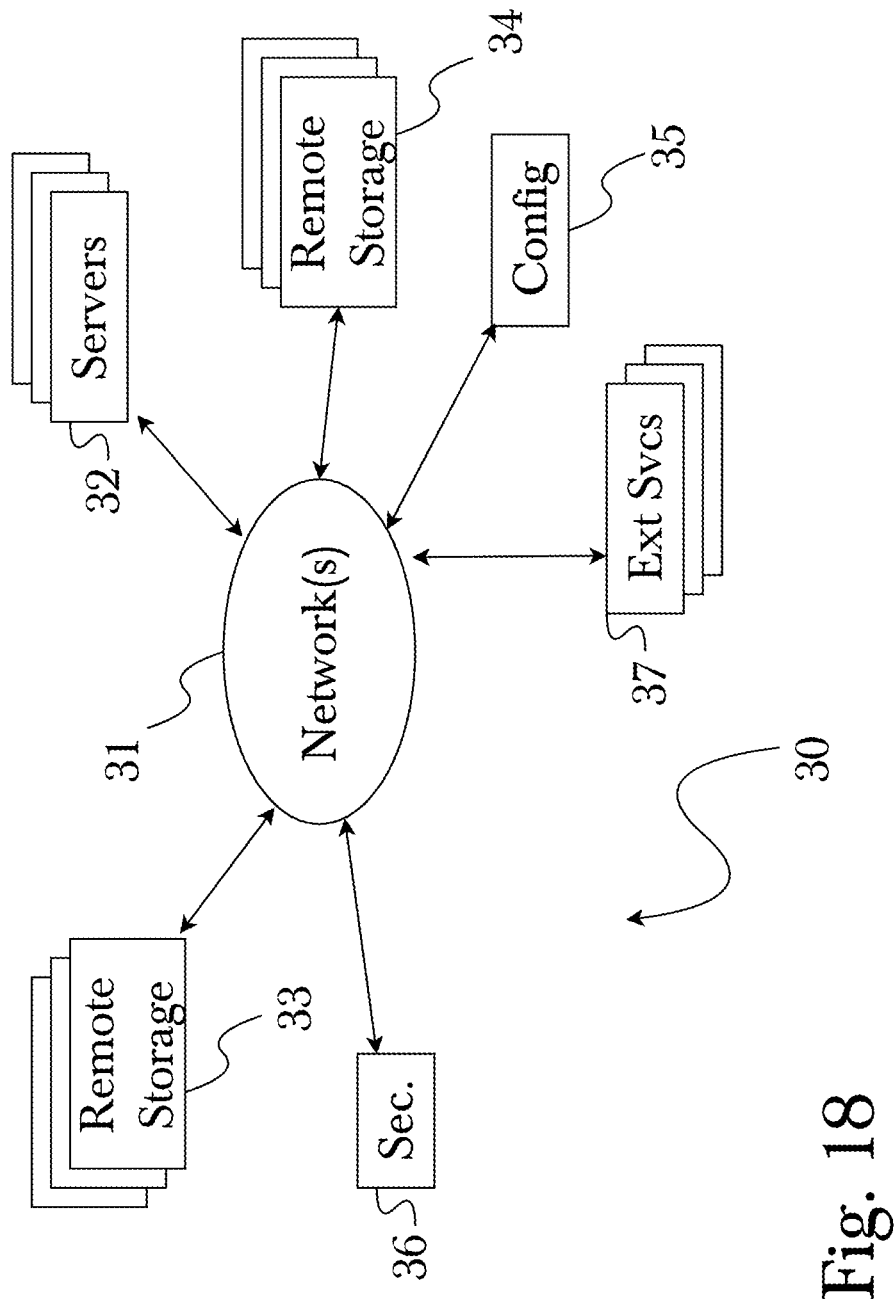
FIG. 18 is a block diagram illustrating an exemplary architectural arrangement of clients, servers, and external services.

In some aspects, systems may be implemented on a distributed computing network, such as one having any number of clients and/or servers. Referring now to FIG. 18, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 17. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 19:
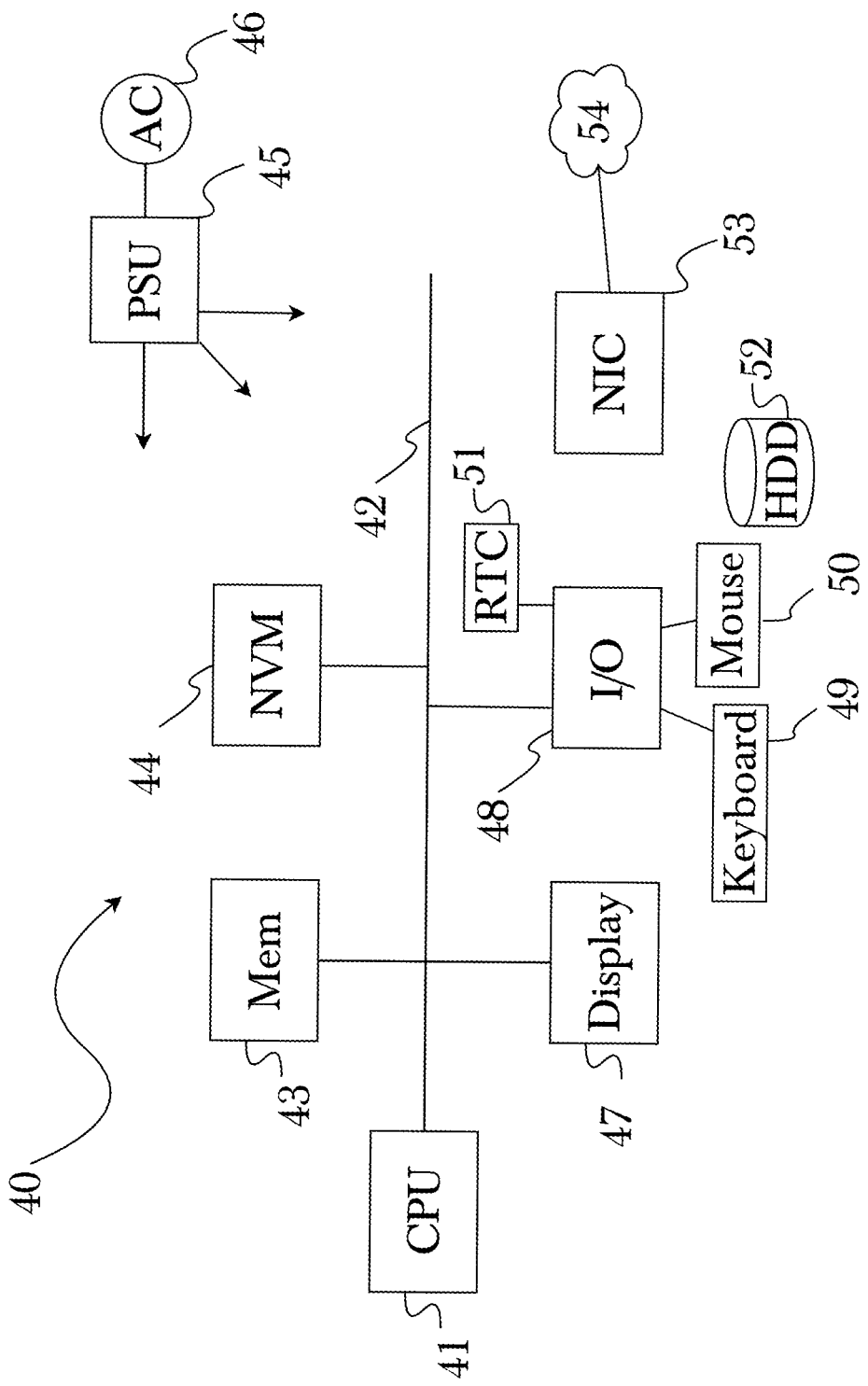
FIG. 19 is another block diagram illustrating an exemplary hardware architecture of a computing device.

FIG. 19 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for model-based prediction using a distributed computational graph workflow, comprising:
   a computing system comprising at least one memory, at least one processor, and at least one non-volatile data storage device; and
   a plurality of network-connected physical sensors;
   wherein the at least one memory comprises a first plurality of programming instructions stored in the at least one memory and operating on the at least one processor, wherein the first plurality of programming instructions, when operating on the at least one processor, causes the computing system to:
      automatically gather telematics data from the plurality of network-connected physical sensors;

record the telematics data and time of receipt in a multidimensional time-series database stored on the at least one non-volatile data storage device;

retrieve a prediction model from the non-volatile data storage device for prediction of a probability of a future event from the received data;

send the telematics data and the prediction model to a distributed computational graph for processing;

receive processed data from the distributed computational graph;

predict the probability of a future event from the processed data;

determine a premium for an insurance product based on at least the predicted probability of the future event;

generate a specific remedial action based on the predicted probability of the future event, wherein the specific remedial action comprises a recommended operational adjustment for communication to an insured party to reduce the probability of the future event;

transmit the specific remedial action to a notification device associated with the insured party;

after transmission of the specific remedial action to the notification device:
automatically gather updated telematics data from the plurality of network-connected physical sensors;
analyze the updated telematics data to determine whether the recommended operational adjustment was implemented by the insured party; and
determine a new premium for an insurance product based on whether the recommended operational adjustment was implemented, as indicated by the updated telematics data; and wherein the at least one memory further comprises a second plurality of programming instructions stored in the at least one memory and operating on the at least one processor, wherein the second plurality of programming instructions, when operating on the at least one processor, causes the computing system to:
receive the prediction model for processing;
construct the distributed computational graph from the prediction model using the at least one processor, the distributed computational graph representing a data processing workflow and comprising a directed graph with nodes representing data transformations and edges representing messaging between the nodes;
receive the telematics data; and
process the telematics data according to the data processing workflow represented by the distributed computational graph.

2. The system of claim 1, wherein the first plurality of programming instructions further causes the computing system to further ingest data from a network-enabled financial market crawler that automatically gathers data from financial markets including stock prices and trades.

3. The system of claim 1, wherein the first plurality of programming instructions further causes the computing system to further ingest data from manual data entry, including human observers during a natural disaster entering data over a network.

4. The system of claim 1, wherein the first plurality of programming instructions further causes the computing system to further ingest data from network connected cameras, including either or all of video, audio, and image data.

5. The system of claim 1, wherein the first plurality of programming instructions further causes the computing system to use machine learning techniques to construct one or more predictive models of received data.

6. A method for model-based prediction using a distributed computational graph workflow, comprising the steps of:
automatically gathering telematics data from a network-connected physical sensor;
recording the telematics data and time of receipt in a multidimensional time-series database stored on a non-volatile data storage device;
retrieving a prediction model from the non-volatile data storage device for prediction of a probability of a future event from the received data;
constructing a distributed computational graph from the retrieved prediction model, the distributed computational graph representing a data processing workflow and comprising a directed graph with nodes representing data transformations and edges representing messaging between the nodes;
processing the telematics data according to the data processing workflow represented by the distributed computational graph;
predicting the probability of a future event from the processed data;
determining a premium for an insurance product based on at least the predicted probability of the future event;
generating a specific remedial action based on the predicted probability of the future event, wherein the specific remedial action comprises a recommended operational adjustment for communication to an insured party to reduce the probability of the future event;
transmitting the specific remedial action to a notification device associated with the insured party; and
after transmission of the specific remedial action to the notification device:
automatically gathering updated telematics data from the plurality of network-connected physical sensors;
analyzing the updated telematics data to determine whether the recommended operational adjustment was implemented by the insured party; and
determining a new premium for an insurance product based on whether the recommended operational adjustment was implemented, as indicated by the updated telematics data.

7. The method of claim 6, further comprising the step of ingesting data from a network-enabled financial market crawler that automatically gathers data from financial markets including stock prices and trades.

8. The method of claim 6, further comprising the step of ingesting data from manual data entry, including human observers during a natural disaster entering data over a network.

9. The method of claim 6, further comprising the step of ingesting data from network connected cameras, including either or all of video, audio, and image data.

10. The method of claim 6, further comprising the step of using machine learning techniques to construct one or more predictive models of received data.

* * * * *